(12) United States Patent
Cantrell

(10) Patent No.: US 11,181,894 B2
(45) Date of Patent: Nov. 23, 2021

(54) COMPUTER SYSTEM AND METHOD OF DEFINING A SET OF ANOMALY THRESHOLDS FOR AN ANOMALY DETECTION MODEL

(71) Applicant: Uptake Technologies, Inc., Chicago, IL (US)

(72) Inventor: Michael Cantrell, Chicago, IL (US)

(73) Assignee: Uptake Technologies, Inc., Chicago, IL (US)

( * ) Notice: Subject to any disclaimer, the term of this patent is extended or adjusted under 35 U.S.C. 154(b) by 469 days.

(21) Appl. No.: 16/161,003

(22) Filed: Oct. 15, 2018

(65) Prior Publication Data

US 2020/0117177 A1 Apr. 16, 2020

(51) Int. Cl.
*G05B 17/02* (2006.01)
*G06N 5/04* (2006.01)
(Continued)

(52) U.S. Cl.
CPC ........... *G05B 23/024* (2013.01); *G05B 17/02* (2013.01); *G05B 23/0221* (2013.01);
(Continued)

(58) Field of Classification Search
CPC .............. G05B 23/024; G05B 23/0256; G05B 23/0221; G05B 23/0243; G05B 17/02;
(Continued)

(56) References Cited

U.S. PATENT DOCUMENTS 5,566,092 A 10/1996 Wang et al.
5,633,800 A 5/1997 Bankert et al.
(Continued)

FOREIGN PATENT DOCUMENTS

WO 2011117570 9/2011
WO 2013034420 3/2013
(Continued)

OTHER PUBLICATIONS

Biswas, "Redundancy-based Approaches in Wireless Multihop Network Design", PhD Dissertation Submitted to Graduate Faculty of North Carolina State University (2014).
(Continued)

*Primary Examiner* — Daniel R Miller
*Assistant Examiner* — Christian T Bryant
(74) *Attorney, Agent, or Firm* — Lee Sullivan Shea & Smith LLP

(57) ABSTRACT

A computing system may create an anomaly detection model to detect anomalies in multivariate data originating from a given data source by extracting a model object for the anomaly detection model using a first set of training data originating from the given data source, establishing starting values of a set of anomaly thresholds for the anomaly detection model using the extracted model object and a second set of training data originating from the given data source, and refining the starting values of the set of anomaly thresholds for at least a subset of the variables included in the multivariate data using the extracted model object and a set of test data. In turn, the computing system may use the anomaly detection model to monitor for anomalies in observation data originating from the given data source.

20 Claims, 11 Drawing Sheets

(51) Int. Cl.
*G06F 21/55* (2013.01)
*G06F 11/00* (2006.01)
*G05B 23/02* (2006.01)
*G06F 21/57* (2013.01)
*G06K 9/62* (2006.01)
*H04L 29/08* (2006.01)
*H04L 29/06* (2006.01)

(52) U.S. Cl.
CPC ..... *G05B 23/0235* (2013.01); *G05B 23/0243* (2013.01); *G05B 23/0256* (2013.01); *G06F 21/552* (2013.01); *G06F 21/577* (2013.01); *G06K 9/6256* (2013.01); *G06K 9/6284* (2013.01); *G06N 5/04* (2013.01); *H04L 67/12* (2013.01); *G06F 11/00* (2013.01); *G06F 2201/00* (2013.01); *H04L 63/1425* (2013.01)

(58) Field of Classification Search
CPC .......................... G05B 23/0235; G06K 9/6284; G06F 21/577; G06F 21/552; G06F 11/00; H04L 67/12; H04L 63/1425; H04L 1/00; G06N 7/005; G06N 20/00; G06N 5/003
See application file for complete search history.

(56) References Cited

U.S. PATENT DOCUMENTS

| | | |
|---|---|---|
| 6,256,594 B1 | 7/2001 | Yamamoto et al. |
| 6,336,065 B1 | 1/2002 | Gibson et al. |
| 6,442,542 B1 | 8/2002 | Ramani et al. |
| 6,473,659 B1 | 10/2002 | Shah et al. |
| 6,622,264 B1 | 9/2003 | Bliley et al. |
| 6,634,000 B1 | 10/2003 | Jammu et al. |
| 6,643,600 B2 | 11/2003 | Yanosik et al. |
| 6,650,949 B1 | 11/2003 | Fera et al. |
| 6,725,398 B1 | 4/2004 | Varma et al. |
| 6,760,631 B1 | 7/2004 | Berkowitz et al. |
| 6,775,641 B2 | 8/2004 | Wegerich et al. |
| 6,799,154 B1 | 9/2004 | Aragones et al. |
| 6,823,253 B2 | 11/2004 | Brunell |
| 6,859,739 B2 | 2/2005 | Wegerich et al. |
| 6,892,163 B1 | 5/2005 | Herzog et al. |
| 6,947,797 B2 | 9/2005 | Dean et al. |
| 6,952,662 B2 | 10/2005 | Wegerich et al. |
| 6,957,172 B2 | 10/2005 | Wegerich |
| 6,975,962 B2 | 12/2005 | Wegerich et al. |
| 7,020,595 B1 | 3/2006 | Adibhatla et al. |
| 7,082,379 B1 | 7/2006 | Bickford et al. |
| 7,100,084 B2 | 8/2006 | Unkle et al. |
| 7,107,491 B2 | 9/2006 | Graichen et al. |
| 7,127,371 B2 | 10/2006 | Duckert et al. |
| 7,233,886 B2 | 6/2007 | Wegerich et al. |
| 7,280,941 B2 | 10/2007 | Bonanni et al. |
| 7,308,385 B2 | 12/2007 | Wegerich et al. |
| 7,373,283 B2 | 5/2008 | Herzog et al. |
| 7,403,869 B2 | 7/2008 | Wegerich et al. |
| 7,409,320 B2 | 8/2008 | Wegerich |
| 7,415,382 B1 | 8/2008 | Bickford et al. |
| 7,428,478 B2 | 9/2008 | Aragones |
| 7,447,666 B2 | 11/2008 | Wang |
| 7,457,693 B2 | 11/2008 | Olsen et al. |
| 7,457,732 B2 | 11/2008 | Aragones et al. |
| 7,509,235 B2 | 3/2009 | Bonissone et al. |
| 7,536,364 B2 | 5/2009 | Subbu et al. |
| 7,539,597 B2 | 5/2009 | Wegerich et al. |
| 7,548,830 B2 | 6/2009 | Goebel et al. |
| 7,634,384 B2 | 12/2009 | Eryurek et al. |
| 7,640,145 B2 | 12/2009 | Wegerich et al. |
| 7,660,705 B1 | 2/2010 | Meek et al. |
| 7,725,293 B2 | 5/2010 | Bonissone et al. |
| 7,739,096 B2 | 6/2010 | Wegerich et al. |
| 7,756,678 B2 | 7/2010 | Bonissone et al. |
| 7,822,578 B2 | 10/2010 | Kasztenny et al. |
| 7,869,908 B2 | 1/2011 | Walker |
| 7,919,940 B2 | 4/2011 | Miller et al. |
| 7,941,701 B2 | 5/2011 | Wegerich et al. |
| 7,962,240 B2 | 6/2011 | Morrison et al. |
| 8,024,069 B2 | 9/2011 | Miller et al. |
| 8,050,800 B2 | 11/2011 | Miller et al. |
| 8,145,578 B2 | 3/2012 | Pershing et al. |
| 8,229,769 B1 | 7/2012 | Hopkins |
| 8,234,420 B2 | 7/2012 | Lueckenbach et al. |
| 8,239,170 B2 | 8/2012 | Wegerich |
| 8,275,577 B2 | 9/2012 | Herzog |
| 8,285,402 B2 | 10/2012 | Lueckenbach et al. |
| 8,311,774 B2 | 11/2012 | Hines |
| 8,352,216 B2 | 1/2013 | Subbu et al. |
| 8,532,795 B2 | 9/2013 | Adavi et al. |
| 8,533,018 B2 | 9/2013 | Miwa et al. |
| 8,560,494 B1 | 10/2013 | Downing et al. |
| 8,620,618 B2 | 12/2013 | Eryurek et al. |
| 8,620,853 B2 | 12/2013 | Herzog |
| 8,626,385 B2 | 1/2014 | Humphrey |
| 8,645,276 B2 | 2/2014 | Wong et al. |
| 8,660,980 B2 | 2/2014 | Herzog |
| 8,689,108 B1 | 4/2014 | Duffield et al. |
| 8,713,467 B1 | 4/2014 | Goldenberg et al. |
| 8,786,605 B1 | 7/2014 | Curtis et al. |
| 8,799,799 B1 | 8/2014 | Cervelli et al. |
| 8,812,960 B1 | 8/2014 | Sun et al. |
| 8,832,594 B1 | 9/2014 | Thompson et al. |
| 8,850,000 B2 | 9/2014 | Collins et al. |
| 8,862,938 B2 | 10/2014 | Souvannarath |
| 8,868,537 B1 | 10/2014 | Colgrove et al. |
| 8,886,601 B1 | 11/2014 | Landau et al. |
| 8,909,656 B2 | 12/2014 | Kumar et al. |
| 8,917,274 B2 | 12/2014 | Ma et al. |
| 8,918,246 B2 | 12/2014 | Friend |
| 8,924,429 B1 | 12/2014 | Fisher et al. |
| 8,935,201 B1 | 1/2015 | Fisher et al. |
| 8,937,619 B2 | 1/2015 | Sharma et al. |
| 8,938,532 B2 * | 1/2015 | Terrell ............... H04L 41/5009 709/224 |
| 8,938,686 B1 | 1/2015 | Erenrich et al. |
| 2002/0091972 A1 | 7/2002 | Harris et al. |
| 2002/0152056 A1 | 10/2002 | Herzog et al. |
| 2003/0055666 A1 | 3/2003 | Roddy et al. |
| 2003/0126258 A1 | 7/2003 | Conkright et al. |
| 2004/0181712 A1 | 9/2004 | Taniguchi et al. |
| 2004/0243636 A1 | 12/2004 | Hasiewicz et al. |
| 2005/0119905 A1 | 6/2005 | Wong et al. |
| 2005/0222747 A1 | 10/2005 | Vhora et al. |
| 2007/0263628 A1 | 11/2007 | Axelsson et al. |
| 2008/0059080 A1 | 3/2008 | Greiner et al. |
| 2008/0059120 A1 | 3/2008 | Xiao et al. |
| 2008/0262985 A1 * | 10/2008 | Cretu ..................... H04L 63/14 706/12 |
| 2009/0091443 A1 * | 4/2009 | Chen ................. G06K 9/00536 340/540 |
| 2012/0271612 A1 | 10/2012 | Barsoum et al. |
| 2012/0310597 A1 | 12/2012 | Uchiyama et al. |
| 2013/0010610 A1 | 1/2013 | Karthikeyan et al. |
| 2013/0024416 A1 | 1/2013 | Herzog |
| 2013/0173218 A1 * | 7/2013 | Maeda ............... G05B 23/0221 702/182 |
| 2013/0283773 A1 | 10/2013 | Hague |
| 2013/0325502 A1 | 12/2013 | Robicsek et al. |
| 2014/0012886 A1 | 1/2014 | Downing et al. |
| 2014/0032132 A1 | 1/2014 | Stratton et al. |
| 2014/0060030 A1 | 3/2014 | Ma et al. |
| 2014/0089035 A1 | 3/2014 | Jericho et al. |
| 2014/0105481 A1 | 4/2014 | Hasselbusch et al. |
| 2014/0121868 A1 | 5/2014 | Zhang et al. |
| 2014/0169398 A1 | 6/2014 | Arndt et al. |
| 2014/0170617 A1 | 6/2014 | Johnson et al. |
| 2014/0184643 A1 | 7/2014 | Friend |
| 2014/0222355 A1 | 8/2014 | Cheim et al. |
| 2014/0330600 A1 | 11/2014 | Candas et al. |
| 2014/0330749 A1 | 11/2014 | Candas et al. |
| 2014/0351642 A1 | 11/2014 | Bates et al. |
| 2014/0357295 A1 | 12/2014 | Skomra et al. |
| 2014/0358601 A1 | 12/2014 | Smiley et al. |
| 2015/0046870 A1 | 2/2015 | Goldenberg et al. |

(56) References Cited

U.S. PATENT DOCUMENTS

| | | | |
|---|---|---|---|
| 2015/0262060 A1 | 9/2015 | Husain et al. | |
| 2016/0042287 A1* | 2/2016 | Eldardiry | G06Q 50/00 706/14 |
| 2016/0057623 A1* | 2/2016 | Dutt | G06F 3/04883 455/411 |
| 2018/0007553 A1* | 1/2018 | Dutt | G06F 21/316 |
| 2018/0046475 A1* | 2/2018 | Wei | G06N 20/00 |
| 2018/0060703 A1* | 3/2018 | Fineis | G01D 21/00 |
| 2018/0247239 A1* | 8/2018 | Horrell | G06F 11/008 |
| 2018/0248905 A1* | 8/2018 | Cote | G06F 17/18 |

FOREIGN PATENT DOCUMENTS

| | | |
|---|---|---|
| WO | 2014145977 | 9/2014 |
| WO | 2014205497 | 12/2014 |

OTHER PUBLICATIONS

Sermann, "Model-based Fault Detection and Diagnosis—Status and Applications", Institute of Automatic Control, Darmstadt University of Technology (2004).

Narasimhan et al., "Combining Model-Based and Feature-Driven Diagnosis Approaches—A Case Study on Electromechanical Actuators", 21st International Workshop on Principles of Diagnosis (2010).

Prentzas et al., Categorizing Approaches Combining Rule-Based and Case-Based Reasoning.

Infor M3 Enterprise Management System, Infor.com (2014).

Infor Equipment, Infor.com (2012).

Infor Introduces Next-Generation Solution for Equipment Dealers and Service Providers, Infor.com (Feb. 20, 2014).

Infor Equipment for Rental, Infor.com (2013).

Waltermire et al, Applying the Continuous Monitoring Technical Reference Model to the Asset, Configuration, and Vulnerability Management Domains (Draft), NIST (Jan. 2012).

Biswas, Trisha. Redundancy-based Approaches in Wireless Multihop Network Design. PhD Dissertation Submitted to Graduate Faculty of North Carolina State University, Raleigh, North Carolina, Mar. 25, 2014, pp. 1-141 [online], [retrieved on May 26, 2015] Retrieved from the Internet <URL:https://repository.lib.ncsu.edu/bitstream/handle/1840.16/9313/etd.pdf?sequence=2&isAllowed=y>.

Isermann, Rolf. Model-based Fault Detection and Diagnosis—Status and Applications. Institute of Automatic Control, Darmstadt University of Technology, Darmstadt, Germany, Jun. 2004, pp. 1-12.[online], [retrieved on Oct. 8, 2015], Retrieved from the Internet <URL: http://citeseerx.ist.psu.edu/viewdoc/download?doi=10.1.1.113.9295&rep=rep1&type=pdf>.

Narasimhan et al. Combining Model-Based and Feature-Driven Diagnosis Approaches—A Case Study on Electromechanical Actuators. 21st International Workshop on Principles of Diagnosis 2010, pp. 1-8. [online], [retrieved on Oct. 8, 2015] Retrieved from the Internet <URL:https://ti.arc.nasa.gov/publications/2266/download/>.

Prentzas et al. Categorizing Approaches Combining Rule-Based and Case-Based Reasoning. Expert Systems 24, Apr. 17, 2007, pp. 1-34 [online], [retrieved on Oct. 8, 2015], Retrieved from the Internet <URL:http://citeseerx.ist.psu.edu/viewdoc/download?doi=10.1.1.143.2780&rep=rep1&type=pdf>.

Infor M3 Enterprise Management System. Datasheet [online]. Infor, 2014 [retrieved May 19, 2015]. Retrieved from the Internet: <URL:www.infor.com.html>.

Infor Equipment. Datasheet [online], Infor, 2012 [retrieved May 19, 2015], Retrieved from the Internet:<URL:www.infor.com.html>.

Infor Introduces Next-Generation Solution for Equipment Dealers and Service Providers. Infor, Feb. 2014 pp. 1-5. [online], [retrieved May 19, 2015]. Retrieved from the Internet:<URL:www.infor.com/company/news/pressroom/?pressreleases/M3equipment.html>.

Infor Equipment for Rental. Datasheet [online] Infor, 2013 [retrieved May 19, 2015]. Retrieved from the Internet:<URL www.infor.com.html>.

Waltermire et al. Applying the Continuous Monitoring Technical Reference Model to the Asset, Configuration, and Vulnerability Management Domains (Draft). National Institute of Standards and Technology, U.S. Department of Commerce, Jan. 2012, pp. 1-23 [online], [retrieved Oct. 6, 2015]. Retrieved from the Internet: URL<https://csrc.nist.gov/CSRC/media/Publications/nistir/7800/draft/documents/Draft-NISTIR-7800.pdf.

* cited by examiner

COMPUTER SYSTEM AND METHOD OF DEFINING A SET OF ANOMALY THRESHOLDS FOR AN ANOMALY DETECTION MODEL

BACKGROUND

Today, machines (also referred to herein as "assets") are ubiquitous in many industries. From locomotives that transfer cargo across countries to farming equipment that harvest crops, assets play an important role in everyday life. Depending on the role that an asset serves, its complexity, and cost, may vary.

Because of the increasing role that assets play, it is also becoming increasingly desirable to monitor and analyze the operation of assets in a given operating environment. To facilitate this, assets may be equipped with sensors that are configured to monitor various operating parameters of the asset and an on-asset computer that is configured to send data indicative of these operating parameters over a network to a central data analytics platform that is configured to analyze the data, in order to learn more about the operation of the assets.

OVERVIEW

One of the operations that is commonly performed by a data analytics platform is anomaly detection, which generally refers to a process of analyzing data originating from a given data source to identify anomalies in that data that may be indicative of a potential problem at the data source. For instance, a data analytics platform may be configured to monitor for anomalies in operating data originating from an asset, which may be indicative of a potential problem with the operation of the asset that should be addressed (e.g., a component failure). A data analytics platform may perform anomaly detection in various other contexts as well.

In order to perform anomaly detection on data originating from a data source, some existing data analytics platforms may be configured to create an anomaly detection model that is subsequently applied to multivariate observation data originating from the data source. In general, such an anomaly detection model may comprise a model object that is used to score multivariate observation data originating from a given data source and a set of anomaly thresholds that are used to evaluate the scored observation data for purposes of determining whether anomalies exist in the multivariate observation data. In this respect, the set of anomaly thresholds may comprise a respective pair of upper and lower anomaly thresholds for each variable present within the multivariate observation data originating from the given data source, although it is possible that the set of anomaly threshold may take other forms as well (e.g., the set of anomaly thresholds may only include an anomaly threshold in a single direction for some variables, or may not include any anomaly threshold for some variables).

Existing data analytics platforms typically create an anomaly detection model for a given data source using "training data" (also referred to as "reference data") originating from the given data source, which is data that is not expected to include any anomalies (i.e., the data is considered to be non-anomalous). For instance, one approach that may be employed by a data analytics platform to create an anomaly detection model for a given data source may begin with the platform using a first set of training data originating from the given data source to extract the model object for the anomaly detection model. In turn, the platform may use the extracted model object to score a second set of training data originating from the given data source, where these "scores" are then used to establish the anomaly thresholds for the anomaly detection model. However, it is typically undesirable to simply adopt the maximum and minimum values of the scored, non-anomalous training data as the upper and lower anomaly thresholds for the anomaly detection model, because this is likely to produce overly-aggressive anomaly thresholds that result in an over-detection of anomalies in observation data originating from the given data source (i.e., "false positives").

Thus, to avoid producing overly-aggressive anomaly thresholds that result in an over-detection of anomalies in observation data originating from the given data source, existing approaches for creating an anomaly detection model typically use the scored second set of training data as a starting point, but then build in predefined tolerances in order to produce more conservative anomaly thresholds that extend beyond the values of the scored second set of training data. For example, a data analytics platform may begin by evaluating the distribution of "scores" for the second set of training data but may then select values that are many standard deviations (e.g., 5-6) from the center point of the distribution as the conservative values to use for the anomaly thresholds. As another example, a data analytics platform may begin by selecting values that are a smaller number of standard deviations (e.g., 1-2) from the center point of the distribution of "scores" for the second set of training data but may then increase those values by a multiplier in order to produce more conservative anomaly thresholds.

However, because the existing approach of establishing anomaly thresholds only uses non-anomalous training data and thus requires incorporation of predefined tolerances that are premised on human assumptions, the resulting anomaly thresholds are likely to be less accurate than anomaly thresholds established using approaches that are more data driven. Further, because of the drawbacks associated with over-detection of anomalies (e.g., the cost of investigating false positives), existing approaches typically err on the side of producing anomaly thresholds that are more conservative, which may lead to an anomaly detection model missing certain anomalies in the observation data originating from the given data source (i.e., "false negatives").

To help improve upon these and other problems with existing approaches, disclosed herein is a new process for defining a set of anomaly thresholds for an anomaly detection model that is configured to detect anomalies in multivariate data originating from a given data source, which (1) uses training data that is not expected to have anomalies to establish a starting point for the set of anomaly thresholds and then (2) uses "test data" that may have anomalies to refine the set of anomaly thresholds. The disclosed process may be used to define a set of anomaly thresholds for various types of anomaly detection models, including but not limited to anomaly detection models based on regression techniques such as principal component analysis (PCA), kernel-based methods, autoencoders, or autoregression, among other examples. Further, the disclosed process may be carried out by any computing system that has access to both training data and test data for a given data source and has sufficient computing capability to perform data analytics operations, examples of which may include a centralized asset data platform or a local analytics device of an asset. For purposes of this disclosure, the computing system that is tasked with carrying out the disclosed process may generally be referred to herein as a "data analytics platform."

At a high level, the disclosed process may involve operations that include (1) using training data originating from the given data source to extract a model object and establish starting values for a set of anomaly thresholds that includes at least one respective anomaly threshold for each of a given set of variables included in the multivariate data originating from the given data source, (2) optionally using the starting values for the set of anomaly thresholds and test data originating from the given data source to differentiate between the variables included within the given set of variables that are unlikely to have anomalous values (which may be referred to herein as "non-anomalous variables") and the remaining variables in the given set of variables that may have anomalous values (which may be referred to herein as "anomalous variables"), and (3) refining the starting values of the anomaly thresholds for at least the anomalous variables using the extracted model object and test data originating from the given data source. As described herein, each of these operations may take various forms and may be carried out in various manners.

For instance, the data analytics platform may begin the process of creating the anomaly detection model by (1) using a first set of training data originating from the given data source to extract a model object for the anomaly detection model and (2) using a second set of training data originating from the given data source to establish starting values for a set of anomaly thresholds for the anomaly detection model. In this respect, the set of anomaly thresholds may include at least one respective anomaly threshold for each of a given set of variables included within the multivariate data originating from the given data source, and in a preferred embodiment, the set of anomaly thresholds may include a respective pair of upper and lower anomaly thresholds for each variable in the given set of variables. However, the set of anomaly thresholds may take various other forms as well.

Further, the function of establishing the starting values for the set of anomaly thresholds using the second set of training data may be carried out using any technique now known or later developed for establishing a set of anomaly thresholds for an anomaly detection mode based on non-anomalous training data. As one possibility, this function may involve scoring the second set of training data using the extracted model object for the anomaly detection model, and then for each variable included in the given set of variables: (1) using the distribution of "score" values for the variable as a basis for selecting an upper bound value and/or a lower bound value for the variable (e.g., by selecting points within the distribution that are a given number of standard deviations on either side of the distribution's center point), (2) optionally applying a multiplier to the selected upper and/or lower bound values within the distribution, and (3) using the resulting values as the starting values for the variable's upper and/or lower anomaly thresholds. In this respect, whether or not an optional multiplier is applied to the selected upper and/or lower bounds may depend in part on the approach used to select the bounds. For example, an optional multiplier may be applied if the bounds are selected using a smaller number of standard deviations (e.g., 2), whereas an optional multiplier may not be applied if the bounds are selected using a larger number of standard deviations (e.g., 5 or more).

The function of establishing the starting values for the set of anomaly thresholds using the second set of training data may take various other forms as well.

After establishing the starting values for the set of anomaly thresholds using the training data originating from the given data source, the data analytics platform may optionally use the starting values for the set of anomaly thresholds and a set of test data originating from the given data source to differentiate between non-anomalous variables and anomalous variables in the given set of variables. The data analytics platform may perform this operation in various manners.

As one possible implementation, the data analytics platform may differentiate between the non-anomalous and anomalous variables in the given set of variables by performing the following functions for each variable in the given set: (1) tightening the starting value(s) of the variable's upper and/or lower anomaly thresholds by a given amount (e.g., by multiplying the starting value(s) by a given multiplier that is less than one), (2) applying the tightened value(s) for the variable's upper and/or lower anomaly thresholds to the set of test data, (3) determining an extent of univariate anomalies detected in the set of test data for the variable, (4) comparing the determined extent of univariate anomalies to a threshold value that serves as a dividing line between a de minimis extent of anomalies and a meaningful extent of anomalies, (5) either identifying the variable as non-anomalous if the extent of univariate anomalies detected in the set of test data for the variable or otherwise considering the variable to be anomalous. In this respect, the criteria that defines whether a univariate anomaly has occurred—as well as the related function of determining an extent of univariate anomalies detected in the test data—may take various forms.

The data analytics platform may differentiate between the non-anomalous and anomalous variables in the given set of variables in various other manners as well.

For any variable in the given set that is deemed to be non-anomalous, the data analytics platform may then decide to use the starting value(s) for the variable's upper and/or lower anomaly thresholds as the final values for the variable's upper and/or lower anomaly thresholds.

After the data analytics platform optionally differentiates between the non-anomalous and anomalous variables in the given set of variables, the data analytics platform may then use the set of test data originating from the given data source to refine the starting values of the anomaly thresholds for at least the anomalous variables in the given set of variables. The data analytics platform may perform this operation in various manners.

As one possible implementation, this operation may involve adjusting the starting values for the anomalous variables' anomaly thresholds in an iterative, multivariate fashion, where each iteration involves multiplying the starting values for the anomalous variables' anomaly thresholds by a given one of a range of multiplier values. In this respect, the range of multiplier values may include values below one (which may tighten the starting values) as well as values above one (which may loosen the starting values). Further, the minimum multiplier value within the range, the maximum multiplier value within the range, and the increments between the multiplier values within the range may all take various forms.

During each respective iteration, the data analytics platform may (1) multiply the starting values for the anomalous variables' anomaly thresholds by a respective multiplier value within the range, (2) apply the adjusted values for the anomalous variables' anomaly thresholds to the set of test data originating from the given data source, and then (3) determine an extent of multivariate anomalies detected in the set of test data when using the adjusted values resulting from multiplying the starting values by the respective multiplier value. In this respect, the criteria that defines whether a multivariate anomaly has occurred—as well as the related function of determining an extent of multivariate anomalies detected in the test data—may take various forms.

As a result of this iterative process described above, the data analytics platform may generate a dataset that includes a respective extent of multivariate anomalies detected in the set of test data associated with each given multiplier value in the range of multiplier values. In this respect, it will be understood that the smaller multiplier values in the range generally result in a greater extent of anomalies being detected in the test data points and the larger multiplier values in the range generally result in a lesser extent of anomalies being detected in the test data points. Further, in practice, there will generally be a transition point within the range of multiplier values, where multiplying the starting values of the anomalous variables' anomaly thresholds by multiplier values that are below that transition point will cause the extent of multivariate anomalies detected to begin increasing exponentially. This transition point may be referred to as the "elbow" of the dataset.

The data analytics platform may then evaluate this dataset in order to select the multiplier value in the range of multiplier values that best "optimizes" the values of the anomalous variables' anomaly thresholds (e.g., in terms of the balance between over-detection and under-detection of anomalies), which will preferably be the multiplier value associated with the "elbow" of the dataset. The data analytics platform may carry out this operation in various manners. As one possibility, the data analytics platform may (1) represent the dataset as a two-dimensional plot where the multiplier value comprises one axis and the extent of multivariate anomalies detected comprises the other axis, (2) identify the data point that is the furthest away from a straight line drawn between the data point corresponding to the smallest multiplier value within the range and the data point corresponding to the largest multiplier value within the range, which is considered to be the "elbow" of the dataset, and (3) select the multiplier value associated with the identified data point. The data analytics platform may select the multiplier value that best "optimizes" the values of the anomalous variables' anomaly thresholds in other manners as well.

After the data analytics platform selects the multiplier value that best "optimizes" the values of the anomalous variables' anomaly thresholds, the data analytics platform may use the selected multiplier value to finalize the values for the anomalous variables' anomaly thresholds. For instance, in one implementation, the data analytics platform may use the adjusted values for the anomalous variables' anomaly thresholds that result from multiplying the starting values by the selected multiplier value as the final values for the variables' anomaly thresholds. In another implementation, the data analytics platform may be configured to compare the selected multiplier value to a minimum acceptable multiplier value and then either (1) use the adjusted values for the anomalous variables' anomaly thresholds that result from multiplying the starting values by the selected multiplier value as the final values for the variables' anomaly thresholds if the selected multiplier value is at or above the minimum acceptable multiplier value or (2) use the starting values for the variables' anomaly thresholds if the selected multiplier value is below the minimum acceptable multiplier value. Other implementations are possible as well.

Once the data analytics platform has determined the final values for all anomaly thresholds in the set of anomaly thresholds for the anomaly detection model using the foregoing process, the data analytics platform may then begin using the anomaly detection model to monitor for anomalies in observation data originating from the given data source.

Accordingly, in one aspect, disclosed herein is a method that involves (a) creating an anomaly detection model that is configured to detect anomalies in multivariate data originating from a given data source by (i) extracting a model object for the anomaly detection model using a first set of training data originating from the given data source, (ii) establishing starting values of a set of anomaly thresholds for the anomaly detection model using the extracted model object and a second set of training data originating from the given data source, wherein the set of anomaly thresholds includes at least one respective anomaly threshold for each of a given set of variables included in the multivariate data originating from the given data source, (iii) refining the starting values of the set of anomaly thresholds for at least anomalous variables within the given set of variables using the extracted model object and a set of test data originating from the given data source, and then (b) using the anomaly detection model to monitor for anomalies in observation data originating from the given data source.

In another aspect, disclosed herein is a computing system that includes a network interface, at least one processor, a non-transitory computer-readable medium, and program instructions stored on the non-transitory computer-readable medium that are executable by the at least one processor to cause the computing system to carry out the functions disclosed herein, including but not limited to the functions of the foregoing method.

In yet another aspect, disclosed herein is a non-transitory computer-readable storage medium provisioned with software that is executable to cause a computing system to carry out the functions disclosed herein, including but not limited to the functions of the foregoing method.

One of ordinary skill in the art will appreciate these as well as numerous other aspects in reading the following disclosure.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

I. Example Network Configuration

Figure 1:
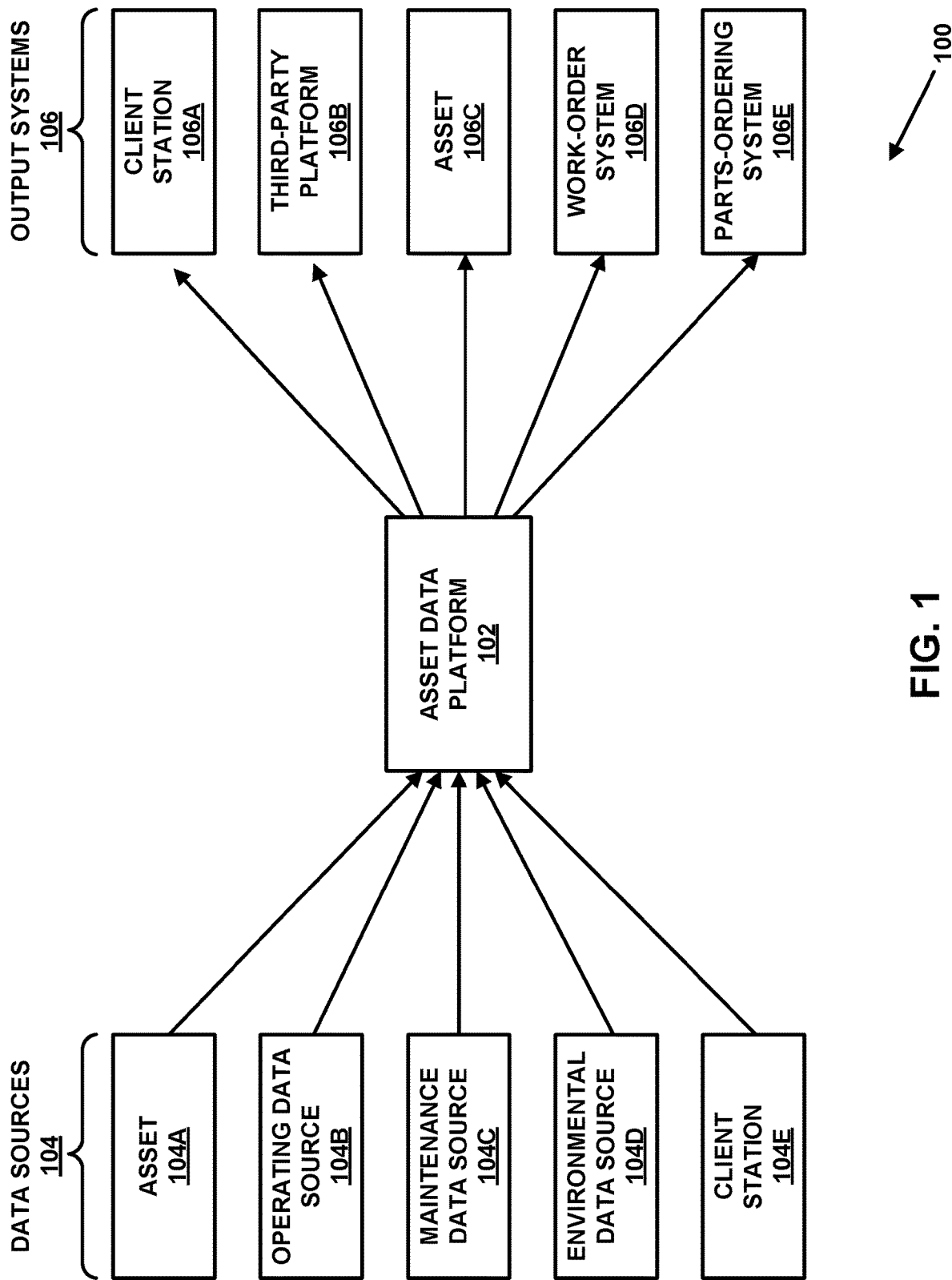
FIG. 1 depicts an example network configuration in which example embodiments may be implemented.

Turning now to the figures, FIG. 1 depicts an example network configuration 100 in which example embodiments may be implemented. As shown, network configuration 100 includes at its core a central computing system 102, which may be communicatively coupled to one or more data sources 104 and one or more output systems 106 via respective communication paths. In such an arrangement, central computing system 102 may generally serve as an "asset data platform" that is configured to perform functions to facilitate the monitoring, analysis, and/or management of various types of "assets," which may take various forms.

For instance, some representative types of assets that may be monitored by asset data platform 102 may include transport vehicles (e.g., locomotives, aircrafts, passenger vehicles, trucks, ships, etc.), equipment for construction, mining, farming, or the like (e.g., excavators, bulldozers, dump trucks, earth movers, etc.), manufacturing equipment (e.g., robotics devices, conveyor systems, and/or other assembly-line machines), electric power generation equipment (e.g., wind turbines, gas turbines, coal boilers), petroleum production equipment (e.g., gas compressors, distillation columns, pipelines), and data network nodes (e.g., personal computers, routers, bridges, gateways, switches, etc.), among other examples. Additionally, an asset may have various other characteristics that more specifically define the type of asset, examples of which may include the asset's brand, make, model, vintage, and/or software version, among other possibilities. In this respect, depending on the implementation, the assets monitored by asset data platform 102 may either be of the same type or various different types. Additionally yet, the assets monitored by asset data platform 102 may be arranged into one or more "fleets" of assets, which refers to any group or two or more assets that are related to one another in some manner (regardless of whether such assets are of the same type).

Broadly speaking, asset data platform 102 may comprise one or more computing systems that have been provisioned with software for carrying out one or more of the platform functions disclosed herein, including but not limited to receiving data related to the operation and/or management of assets (broadly referred to herein as "asset-related data") from data sources 104, performing data ingestion and/or data analytics operations on the asset-related data received from data sources 104, and then outputting data and/or instructions related to the operation and/or management of assets to output systems 106. The one or more computing systems of asset data platform 102 may take various forms and be arranged in various manners.

For instance, as one possibility, asset data platform 102 may comprise computing infrastructure of a public, private, and/or hybrid cloud (e.g., computing and/or storage clusters) that has been provisioned with software for carrying out one or more of the platform functions disclosed herein. In this respect, the entity that owns and operates asset data platform 102 may either supply its own cloud infrastructure or may obtain the cloud infrastructure from a third-party provider of "on demand" computing resources, such include Amazon Web Services (AWS), Microsoft Azure, Google Cloud, Alibaba Cloud, or the like. As another possibility, asset data platform 102 may comprise one or more dedicated servers that have been provisioned with software for carrying out one or more of the platform functions disclosed herein. Other implementations of asset data platform 102 are possible as well.

Further, in practice, the software for carrying out the disclosed platform functions may take various forms. As one possibility, the platform software may comprise executable program instructions that cause asset data platform 102 to perform data ingestion operations on asset-related data received from data sources 104, including but not limited to extraction, transformation, and loading operations, among other examples. As another possibility, the platform software may comprise executable program instructions that cause asset data platform 102 to perform data analytics operations based on the asset-related data received from data sources 104, including but not limited to failure prediction, anomaly detection, fuel management, noise filtering, image analysis, predictive recommendations, and label correction, among other examples. As yet another possibility, the platform software may comprise executable program instructions that cause asset data platform 102 to output data and/or instructions related to the operation and/or management of assets for receipt by one or more output systems 106.

As one specific example, the platform software may comprise executable program instructions for outputting data related to the operation and/or management of assets that is to be presented to a user (e.g., asset-related data received from data sources 104 and/or the results of the data analytics operations performed by asset data platform 102), and these program instructions may take the form of discrete "applications" that are each tailored for particular end users, particular groups of assets, and/or particular purposes. Some representative examples of such applications may include an asset performance management application, an asset fleet management application, a service optimization application, and an asset dealer operations application, among other possibilities.

The software for carrying out the disclosed platform functions may take various other forms as well.

As described above, asset data platform 102 may be configured to receive asset-related data from one or more data sources 104. These data sources—and the asset-related data output by such data sources—may take various forms. To illustrate, FIG. 1 shows some representative examples of data sources 104 that may provide asset-related data to asset data platform 102, which are discussed in further detail below. However, it should be understood that these example data sources are merely provided for purposes of illustration, and that asset data platform 102 may be configured to receive asset-related data from other types of data sources as well.

For instance, one type of data source 104 may take the form of an asset 104A, which may be equipped with components that are configured to capture data that is indicative of the operation of the asset—referred to herein as "operating data"—and then transmit the asset's operating data to asset data platform 102 over the respective communication path between asset 104A and asset data platform 102. In this respect, asset 104A may take any of the various forms described above, including but not limited to a transport vehicle, heavy equipment, manufacturing equipment, electric power generation equipment, and/or petroleum production equipment, among other types of assets. Further, it should be understood that the components of asset 104A for capturing and transmitting the asset's operating data either may be included as part of asset 104A as manufactured or may be affixed to asset 104A at some later date, among other possibilities.

The operating data that is captured and sent by asset 104A may take various forms. As one possibility, an asset's operating data may include sensor data that comprises time-series measurements for certain operating parameters of the asset, examples of which may include speed, velocity, acceleration, location, weight, temperature, pressure, friction, vibration, power usage, throttle position, fluid usage, fluid level, voltage, current, magnetic field, electric field, presence or absence of objects, current position of a component, and power generation, among many others. As another possibility, an asset's operating data may include abnormal-conditions data that indicates occurrences of discrete abnormal conditions at the asset, examples of which include fault codes that indicate the occurrence of certain faults at the asset (e.g., when an operating parameter exceeds a threshold), asset shutdown indicators, and/or other types of abnormal-condition indicators. As yet another possibility, an asset's operating data may include data that has been derived from the asset's sensor data and/or abnormal-conditions data, examples of which may include "roll-up" data (e.g., an average, mean, median, etc. of the raw measurements for an operating parameter over a given time window) and "features" data (e.g., data values that are derived based on the raw measurements of two or more of the asset's operating parameters). An asset's operating data may take various other forms as well.

In practice, an asset's operating data may also include or be associated with data that identifies the origin of the operating data. This origin data may take various forms. For example, such origin data may include identifying information for the originating asset (e.g., an asset ID and/or data indicating the asset's type, brand, make, model, age, software version, etc.) and/or identifying information for the component of asset 104A that captured the operating data (e.g., a sensor ID), among other possibilities. As another example, such origin data may include data indicating the time at which the operating data was captured (e.g., a timestamp) and/or the asset's location when the operating data was captured (e.g., GPS coordinates), to the extent that such location is not otherwise included in the operating data. Asset data platform 102 may receive other types of data from asset 104A as well.

Further, asset data platform 102 may be configured to receive operating data from asset 104A in various manners. As one possibility, asset 104A may be configured to send its operating data to asset data platform 102 in a batch fashion, in which case asset data platform 102 may receive periodic transmissions of operating data from asset 104A (e.g., on an hourly, daily, or weekly basis). As another possibility, asset data platform 102 may receive operating data from asset 104A in a streaming fashion as such operating data is captured by asset 104A. As yet another possibility, asset data platform 102 may receive operating data from asset 104A in response to sending a request for such data to asset 104A, in which case asset data platform 102 may be configured to periodically send requests for operating data to asset 104A. Asset data platform 102 may be configured to receive operating data from asset 104A in other manners as well.

Another type of data source 104 may take the form of operating data source 104B, which may comprise a computing system that is configured to receive operating data from one or more upstream sources of operating data (e.g., assets) and then provide this operating data to asset data platform 102 over the respective communication path between operating data source 104B and asset data platform 102. Such an operating data source may take various forms. As one possibility, operating data source 104B may comprise an existing data platform of a third-party organization that receives and/or maintains operating data for one or more assets, such as a data platform operated by an asset owner, an asset dealer, an asset manufacturer, an asset repair shop, or the like. As another possibility, operating data source 104B may comprise an intermediary system that compiles operating data from a plurality of upstream sources of operating data and then provides that compiled operating data to asset data platform 102. For example, such an intermediary system may take the form of a computing system located in proximity to a fleet of assets (e.g., at a job site or wind farm) that is configured to compile operating data for the fleet of assets or a computing system that is configured to compile operating data maintained by several third-party data platforms, among other possibilities. Operating data source 104B may take other forms as well.

The operating data that is maintained and sent by operating data source 104B may take various forms, including but not limited to any of the forms described above. In addition to the operating data received from the one or more upstream sources, the operating data provided by operating data source 104B may also include additional operating data that is generated by operating data source 104B itself, such as operating data that operating data sources 104B derives based on the operating data received from the one or more upstream sources (e.g., abnormal-conditions data, roll-up data, features data, etc.).

Further, as with asset 104A, asset data platform 102 may be configured to receive operating data from operating data source 104B in various manners. As one possibility, operating data source 104B may be configured to send its operating data to asset data platform 102 in a batch fashion, in which case asset data platform 102 may receive periodic transmissions of operating data from operating data source 104B (e.g., on an hourly, daily, or weekly basis). As another possibility, asset data platform 102 may receive operating data from operating data source 104B in a streaming fashion as such operating data is received and/or otherwise generated by operating data source 104B. As yet another possibility, asset data platform 102 may receive operating data from operating data source 104B in response to sending a request for such data to operating data source 104B, in which case asset data platform 102 may be configured to periodically send requests for operating data to operating data source 104B. As still another possibility, asset data platform 102 may receive operating data from operating data source 104B by accessing an Application Programming Interface (API) that has been made available by operating data source 104B, subscribing to a service provided by operating data source 104B, or the like. Asset data platform 102 may be configured to receive operating data from operating data source 104B in other manners as well.

Yet another type of data source 104 may take the form of an asset maintenance data source 104C, which may comprise a computing system that is configured to generate and/or receive data related to the maintenance of a plurality of assets—referred to herein as "maintenance data"—and then send this maintenance data to asset data platform 102 over the respective communication path between asset maintenance data source 104C and asset data platform 102. In this respect, asset maintenance data source 104C may take various forms. As one possibility, asset maintenance data source 104C may comprise an existing data platform of a third-party organization that is interested in tracking the maintenance of assets, such as an asset owner, asset dealer, asset manufacturer, asset repair shop, or the like. As another possibility, asset maintenance data source 104C may comprise an intermediary system that compiles asset maintenance data from multiple upstream sources (e.g., multiple repair shops) and then provides that compiled maintenance data to asset data platform 102. Asset maintenance data source 104C may take other forms as well.

The asset maintenance data that is maintained and sent by asset maintenance data source 104C may take various forms. As one example, the asset maintenance data may include details regarding inspections, maintenance, servicing, and/or repairs that have been performed or are scheduled to be performed on assets (e.g., work order data). As another example, the asset maintenance data may include details regarding known occurrences of failures at assets (e.g., date of failure occurrence, type of failure occurrence, etc.). Other examples are possible as well. As with the operating data, the asset maintenance data may also include or be associated with data indicating the origins of the asset maintenance data (e.g., source identifier, timestamp, etc.).

Further, asset data platform 102 may be configured to receive operating data from asset maintenance data source 104C in various manners, including but not limited to any of the manners discussed above with respect to operating data source 104B.

Still another type of data source 104 may take the form of environmental data source 104D, which may comprise a computing system that is configured to generate and/or receive data about an environment in which assets operate—referred to herein as "environmental data"—and then send this data to asset data platform 102 over the respective communication path between environmental data source 104D and asset data platform 102. In this respect, environmental data source 104D—and the environmental data provided thereby—may take various forms.

As one possibility, environmental data source 104D may take the form of a weather data source that provides information regarding the weather at locations where assets operate (e.g., ambient temperature, air pressure, humidity, wind direction, wind speed, etc.). As another possibility, environmental data source 104D may take the form of a geospatial data source that provides information regarding the geography and/or topology at locations where assets operate. As yet another possibility, environmental data source 104D may take the form of a satellite image data source that provides satellite imagery for locations where assets operate. As still another possibility, environmental data source 104D may take the form of a traffic data source that provides information regarding ground, air, and/or water traffic at locations where assets operate. Environmental data source 104D may take other forms as well.

Further, in practice, asset data platform 102 may be configured to receive operating data from asset environmental data source 104D in various manners, including but not limited to any of the manners discussed above with respect to operating data source 104B.

Another type of data source 104 may take the form of client station 104E, which may comprise any computing device that is configured to receive user input related to the operation and/or management of assets (e.g., information entered by a fleet operator, a repair technician, or the like) and then send that user input to asset data platform 102 over the respective communication path between client station 104E and asset data platform 102. In this respect, client station 104E may take any of various forms, examples of which may include a desktop computer, a laptop, a netbook, a tablet, a smartphone, and/or a personal digital assistant (PDA), among other possibilities.

The user input that is entered into client station 104E and sent to asset data platform 102 may comprise various different kinds of information, including but not limited to the kinds of information discussed above with respect to the other data sources. For instance, as one possibility, the user input may include certain kinds of operating data, maintenance data, and/or environmental data that may be input into asset data platform 102 by a user rather than being received from one of the aforementioned data sources. As another possibility, the user input may include certain user-defined settings or logic that is to be used by asset data platform 102 when performing data ingestion and/or data analytics operations. The user input that is entered into client station 104E and sent to asset data platform 102 may take various other forms as well.

The aforementioned data sources 104 are merely provided for purposes of illustration, and it should be understood that the asset data platform's data sources may take various other forms as well. For instance, while FIG. 1 shows several different types of data sources 104, it should be understood that asset data platform 102 need not be configured to receive asset-related data from all of these different types of data sources, and in fact, asset data platform 102 could be configured to receive asset-related data from as little as a single data source 104. Further, while data sources 104A-E have been shown and described separately, it should be understood that these data sources may be combined together as part of the same physical computing system (e.g., an organization's existing data platform may serve as both operating data source 104B and maintenance data source 104C). Further yet, it should be understood that asset data platform 102 may be configured to receive other types of data related to the operation and/or management of assets as well, examples of which may include asset management data (e.g., route schedules and/or operational plans), enterprise data (e.g., point-of-sale (POS) data, customer relationship management (CRM) data, enterprise resource planning (ERP) data, etc.), and/or financial markets data, among other possibilities.

As shown in FIG. 1, asset data platform 102 may also be configured to output asset-related data and/or instructions for receipt by one or more output systems 106. These output systems—and the data and/or instructions provided to such output systems—may take various forms. To illustrate, FIG. 1 shows some representative examples of output systems 106 that may receive asset-related data and/or instructions from asset data platform 102, which are discussed in further detail below. However, it should be understood that these example output systems are merely provided for purposes of illustration, and that asset data platform 102 may be configured to output asset-related data and/or instructions to other types of output systems as well.

For instance, one type of output system 106 may take the form of client station 106A, which may comprise any computing device that is configured to receive asset-related data from asset data platform 102 over the respective communication path between client station 106A and asset data platform 102 and then present such data to a user (e.g., via a front-end application that is defined by asset data platform 102). In this respect, client station 106A may take any of various forms, examples of which may include a desktop computer, a laptop, a netbook, a tablet, a smartphone, and/or a PDA, among other possibilities. Further, it should be understood that client station 106A could either be a different device than client station 104E or could be the same device as client station 104E.

The asset-related data that is output for receipt by client station 106A may take various forms. As one example, this asset-related data may include a restructured version of asset-related data that was received by asset data platform 102 from one or more data sources 104 (e.g., operating data, maintenance data, etc.). As another example, this asset-related data may include data that is generated by asset data platform 102 based on the asset-related data received from data sources 104, such as data resulting from the data analytics operations performed by asset data platform 102 (e.g., predicted failures, recommendations, alerts, etc.). Other examples are possible as well.

Along with the asset-related data that is output for receipt by client station 106A, asset data platform 102 may also output associated data and/or instructions that define the visual appearance of a front-end application (e.g., a graphical user interface (GUI)) through which the asset-related data is to be presented on client station 106A. Such data and/or instructions for defining the visual appearance of a front-end application may take various forms, examples of which may include Hypertext Markup Language (HTML), Cascading Style Sheets (CSS), and/or JavaScript, among other possibilities. However, depending on the circumstance, it is also possible that asset data platform 102 may output asset-related data to client station 106A without any associated data and/or instructions for defining the visual appearance of a front-end application.

Further, client station 106A may receive asset-related data from asset data platform 102 in various manners. As one possibility, client station 106A may send a request to asset data platform 102 for certain asset-related data and/or a certain front-end application, and client station 106A may then receive asset-related data in response to such a request. As another possibility, asset data platform 102 may be configured to "push" certain types of asset-related data to client station 106A, such as scheduled or event-based alerts, in which case client station 106A may receive asset-related data from asset data platform 102 in this manner. As yet another possibility, asset data platform 102 may be configured to make certain types of asset-related data available via an API, a service, or the like, in which case client station 106A may receive asset-related data from asset data platform 102 by accessing such an API or subscribing to such a service. Client station 106A may receive asset-related data from asset data platform 102 in other manners as well.

Another type of output system 106 may take the form of a data platform 106B operated by a third-party organization that interested in the operation and/or management of assets, such as an asset owner, an asset dealer, an asset manufacturer, an asset repair shop, or the like. For instance, a third-party organization such as this may have its own data platform 106B that already enables users to access and/or interact with asset-related data through front-end applications that have been created by the third-party organization, but data platform 106B may not be programmed with the capability to ingest certain types of asset-related data or perform certain types of data analytics operations. In such a scenario, asset data platform 102 may be configured to output certain asset-related data for receipt by data platform 106B.

The asset-related data that is output for receipt by data platform 106B may take various forms, including but not limited any of the forms described above in connection with the output to client station 106A. However, unlike for client station 104A, the asset-related data that is output for receipt by data platform 106B typically need not include any associated data and/or instructions for defining the visual appearance of a front-end application, because data platform 106B may be performing operations on the asset-related data from asset data platform 102 beyond presenting it to a user via a front-end application.

Further, data platform 106B may receive asset-related data from asset data platform 102 in various manners, including but not limited to any of the manners discussed above with respect to client station 106A (e.g., by sending a request to asset data platform 102, having data "pushed" by asset data platform, or accessing an API or service provided by asset data platform 102).

Yet another type of output system 106 may take the form of asset 106C, which may be equipped with components that are configured to receive asset-related data and/or instructions from asset data platform 102 and then act in accordance with the received data and/or instructions. In this respect, asset 106C may take any of the various forms described above, including but not limited to a transport vehicle, heavy equipment, manufacturing equipment, electric power generation equipment, and/or petroleum production equipment, among other types of assets. Further, it should be understood that asset 106C could either be a different asset than asset 104A or could be the same asset as asset 104A.

The asset-related data and/or instructions that are output for receipt by asset 106C may take various forms. As one example, asset data platform 102 may be configured to send asset 106C certain data that has been generated by asset data platform 102 based on the asset-related data received from data sources 104, such as data resulting from a data analytics operation performed by asset data platform 102 (e.g., predicted failures, recommendations, alerts, etc.), in which case asset 106C may receive this data and then potentially adjust its operation in some way based on the received data. As another example, asset data platform 102 may be configured to generate and send an instruction for asset 106C to adjust its operation in some way (e.g., based on the asset-related data received from data sources 104), in which case asset 106C may receive this instruction and then potentially adjust its operation in accordance with the instruction. As yet another example, asset data platform 102 may be configured to generate and send an instruction for asset 106C to perform a data analytics operation locally at asset 106C, in which case asset 106C may receive the instruction and then locally perform the data analytics operation. In some cases, in conjunction with sending asset 106C an instruction to perform a data analytics operation, asset data platform 102 may also provide asset 106C with executable program instructions and/or program data that enable asset 106C to perform the data analytics operation (e.g., a predictive model). However, in other cases, asset 106C may already be provisioned with executable program instructions for performing the data analytics operation. Other examples are possible as well.

Further, in practice, asset 106C may receive asset-related data and/or instructions from asset data platform 102 in various manners, including but not limited to any of the manners discussed above with respect to client station 106A.

Still another type of output system 106 may take the form of work-order system 106D, which may comprise a computing system that is configured to receive asset-related data and/or instructions from asset data platform 102 over the respective communication path between work-order system 106D and asset data platform 102 and then generate a work order in accordance with the received data and/or instructions.

A further type of output system 106 may take the form of parts-ordering system 106E, which may comprise a computing system that is configured to receive asset-related data and/or instructions from asset data platform 102 over the respective communication path between parts-ordering system 106E and asset data platform 102 and then generate a parts order in accordance with the received data and/or instructions.

The aforementioned output systems 106 are merely provided for purposes of illustration, and it should be understood that output systems in communication with asset data platform 102 may take various other forms as well. For instance, while FIG. 1 shows several different types of output systems 106, it should be understood that asset data platform 102 need not be configured to output asset-related data and/or instructions for receipt by all of these different types of output systems, and in fact, asset data platform 102 could be configured to asset-related data and/or instructions for receipt by as little as a single output system 106. Further, while output systems 106A-E have been shown and described separately, it should be understood that these output systems may be combined together as part of the same physical computing system. Further yet, it should be understood that asset data platform 102 may be configured to output asset-related data and/or instructions for receipt by other types of output systems as well.

As discussed above, asset data platform 102 may communicate with the one or more data sources 104 and one or more output systems 106 over respective communication paths. Each of these communication paths may generally comprise one or more communication networks and/or communications links, which may take any of various forms. For instance, each respective communication path with asset data platform 102 may include any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the communication networks and/or links that make up each respective communication path with asset data platform 102 may be wireless, wired, or some combination thereof, and may carry data according to any of various different communication protocols.

Although not shown, the respective communication paths with asset data platform 102 may also include one or more intermediate systems. For example, it is possible that a given data source 104 may send asset-related data to one or more intermediary systems, such as an aggregation system, and asset data platform 102 may then be configured to receive the asset-related data from the one or more intermediary systems. As another example, it is possible that asset data platform 102 may communicate with a given output system 106 via one or more intermediary systems, such as a host server (not shown). Many other configurations are also possible.

It should be understood that network configuration 100 is one example of a network configuration in which embodiments described herein may be implemented. Numerous other arrangements are possible and contemplated herein. For instance, other network configurations may include additional components not pictured and/or more or less of the pictured components.

II. Example Platform

Figure 2:
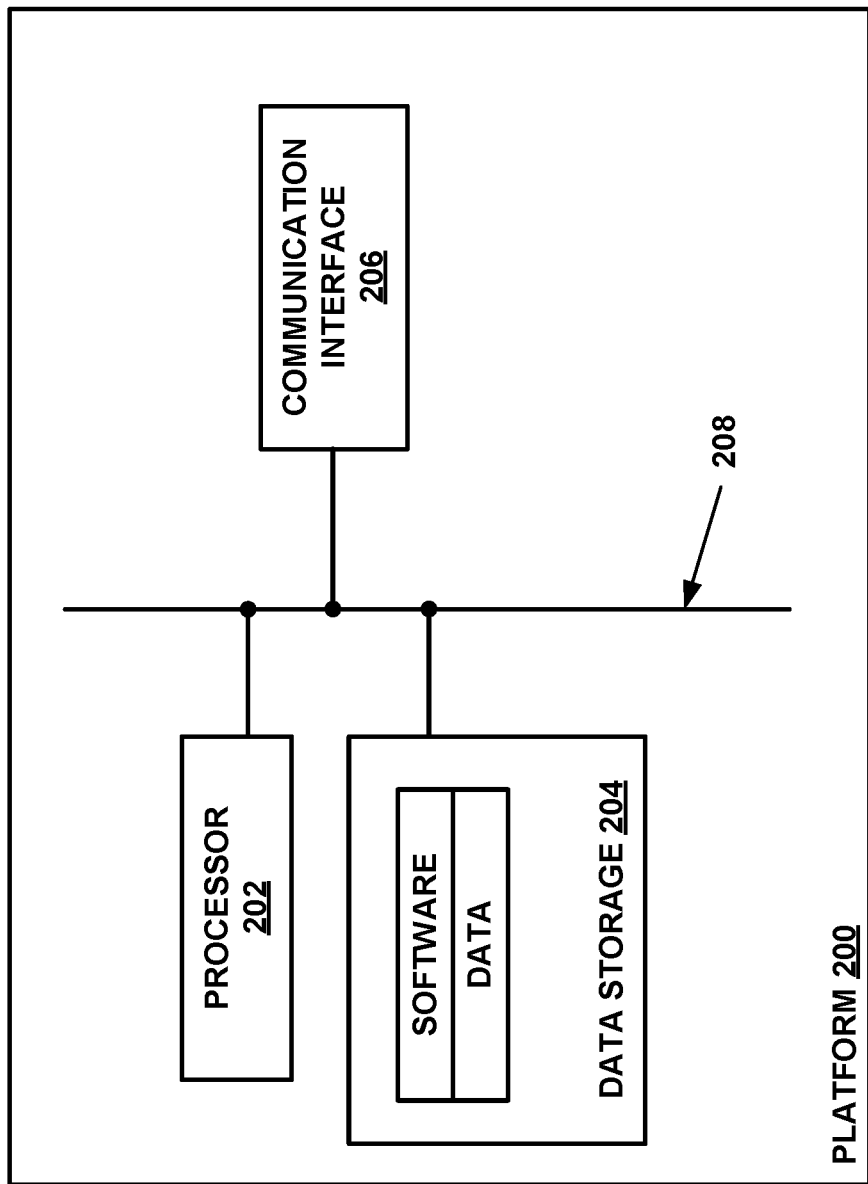
FIG. 2 depicts a simplified block diagram of an example asset data platform from a structural perspective.

FIG. 2 is a simplified block diagram illustrating some structural components that may be included in an example computing platform 200, which could serve as the asset data platform 102 in FIG. 1. In line with the discussion above, platform 200 may generally comprise one or more computer systems (e.g., one or more servers), and these one or more computer systems may collectively include at least a processor 202, data storage 204, and a communication interface 206, all of which may be communicatively linked by a communication link 208 that may take the form of a system bus, a communication network such as a public, private, or hybrid cloud, or some other connection mechanism.

Processor 202 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 202 could comprise processing components that are distributed across a plurality of physical computing devices connected via a network, such as a computing cluster of a public, private, or hybrid cloud.

In turn, data storage 204 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 204 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 2, data storage 204 may be provisioned with software components that enable the platform 200 to carry out the functions disclosed herein. These software components may generally take the form of program instructions that are executable by the processor 202 to carry out the disclosed functions, which may be arranged together into software applications, virtual machines, software development kits, toolsets, or the like.

Further, data storage 204 may be arranged to store asset-related data in one or more databases, file systems, or the like. For example, data storage 204 may be configured to store data using technologies such Apache Cassandra, Apache Hadoop, PostgreSQL, and/or MongoDB, among other possibilities. Data storage 204 may take other forms and/or store data in other manners as well.

Communication interface 206 may be configured to facilitate wireless and/or wired communication with data sources and output systems, such as data sources 104 and output systems 106 in FIG. 1. Additionally, in an implementation where platform 200 comprises a plurality of physical computing devices connected via a network, communication interface 206 may be configured to facilitate wireless and/or wired communication between these physical computing devices (e.g., between computing and storage clusters in a cloud network). As such, communication interface 206 may take any suitable form for carrying out these functions, examples of which may include an Ethernet interface, a serial bus interface (e.g., Firewire, USB 2.0, etc.), a chipset and antenna adapted to facilitate wireless communication, and/or any other interface that provides for wireless and/or wired communication. Communication interface 206 may also include multiple communication interfaces of different types. Other configurations are possible as well.

Although not shown, platform 200 may additionally include one or more interfaces that provide connectivity with external user-interface equipment (sometimes referred to as "peripherals"), such as a keyboard, a mouse or trackpad, a display screen, a touch-sensitive interface, a stylus, a virtual-reality headset, speakers, etc., which may allow for direct user interaction with platform 200.

It should be understood that platform 200 is one example of a computing platform that may be used with the embodiments described herein. Numerous other arrangements are possible and contemplated herein. For instance, other computing platforms may include additional components not pictured and/or more or less of the pictured components.

Figure 3:
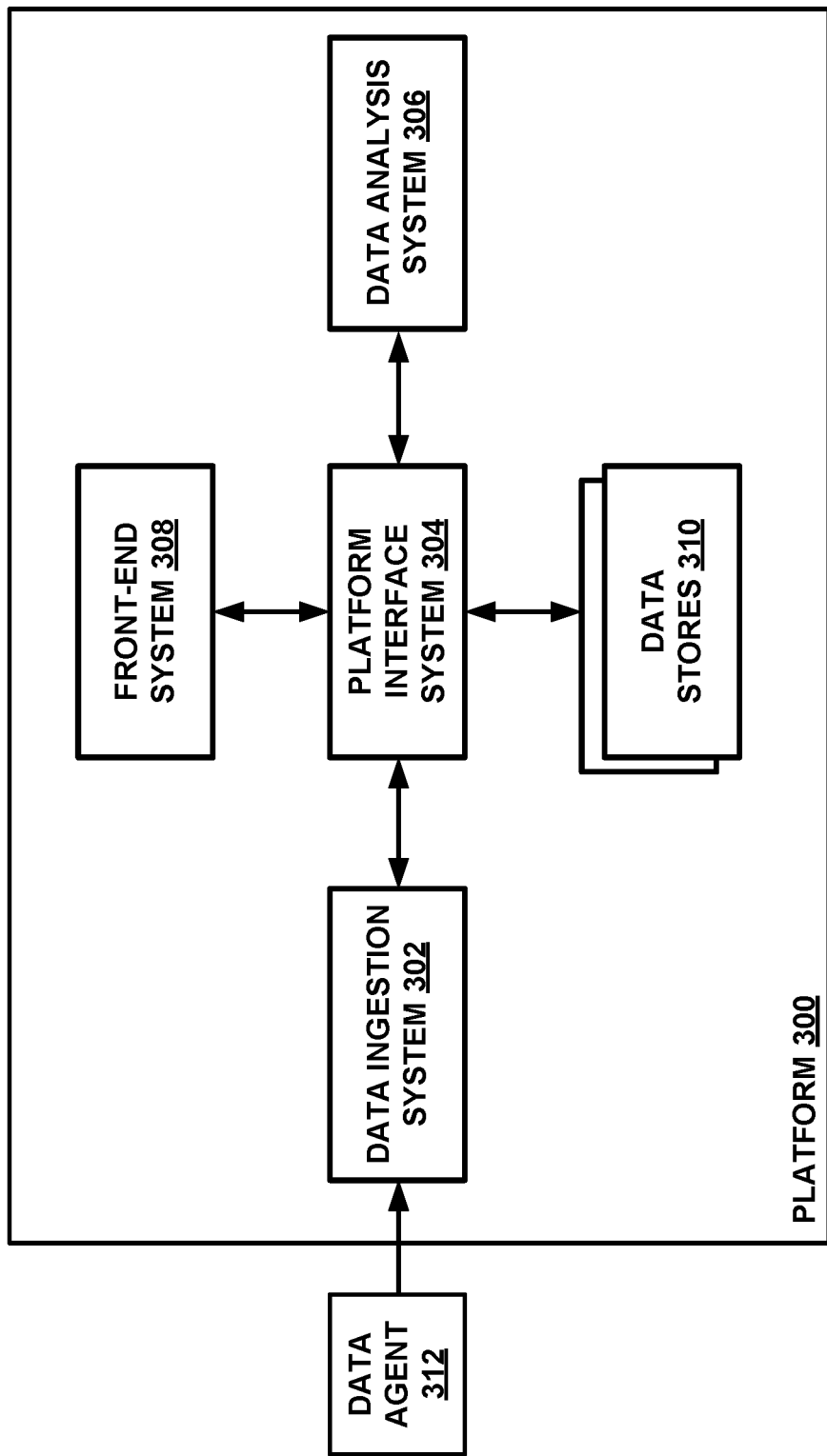
FIG. 3 depicts a simplified block diagram of an example asset data platform from a functional perspective.

Referring now to FIG. 3, another simplified block diagram is provided to illustrate some functional systems that may be included in an example platform 300. For instance, as shown, the example platform 300 may include a data ingestion system 302, a platform interface system 304, a data analysis system 306, a front-end system 308, and one or more data stores 310, each of which comprises a combination of software and hardware that is configured to carry out particular functions. In line with the discussion above, these functional systems may be implemented on one or more computing systems, which may take the form of computing infrastructure of a public, private, and/or hybrid cloud or one or more dedicated servers, among other possibilities.

At a high level, data ingestion system 302 may be configured to ingest asset-related data received from the platform's one or more data sources, transform the ingested data into a standardized structure, and then pass the ingested data to platform interface system 304. In this respect, the function of ingesting received data may be referred to as the "extraction" (or "acquisition") stage within data ingestion system 302, the function of transforming the ingested data into a desired structure may be referred to as the "transformation" stage within data ingestion system 302, and the function of passing the ingested data to platform interface system 304 may be referred to as the "load" stage within data ingestion system 302. (Alternatively, these functions may collectively be referred to as the ETL stage). In some embodiments, data ingestion system 302 may also be configured to enhance the ingested data before passing it to platform interface system 304. This function of enhancing the ingested data may be referred to as the "enhancement" stage within data ingestion system 302. However, data ingestion system 302 may take various other forms and perform various other functions as well.

At the extraction stage, data ingestion system 302 may be configured to receive and ingest various types of asset-related data from various types of data sources, including but not limited to the types of asset-related data and data sources 104 discussed above with reference to FIG. 1. Further, in line with the discussion above, data ingestion system 302 may be configured to receive asset-related data from a data source in various manners. For instance, one possibility, data ingestion system 302 may be configured to receive batch transmissions of asset-related data from a data source. As another possibility, data ingestion system 302 may be configured to receive asset-related data from a data source in a streaming fashion. As yet another possibility, data ingestion system 302 may be configured to receive asset-related data from a data source in response to sending a request for such data to the data source, in which case data ingestion system 302 may be configured to periodically send requests for asset-related data to the data source. As still another possibility, data ingestion system 302 may receive asset-related data from a data source by subscribing to a service provided by the data source (e.g., via an API or the like). Data ingestion system 302 may be configured to receive asset-related data from a data source in other manners as well.

Before data ingestion system 302 receives asset-related data from certain data sources, there may also be some configuration that needs to place at such data sources. For example, a data source may be configured to output the particular set of asset-related data that is of interest to platform 300. To assist with this process, the data source may be provisioned with a data agent 312, which generally comprises a software component that functions to access asset-related data at the given data source, place the data in the appropriate format, and then facilitate the transmission of that data to platform 300 for receipt by data ingestion system 302. In other cases, however, the data sources may be capable of accessing, formatting, and transmitting asset-related data to platform 300 without the assistance of a data agent.

Turning to the transformation phase, data ingestion system 302 may generally be configured to map and transform ingested data into one or more predefined data structures, referred to as "schemas," in order to standardize the ingested data. As part of this transformation stage, data ingestion system 302 may also drop any data that cannot be mapped to a schema.

In general, a schema is an enforceable set of rules that define the manner in which data is to be structured in a given system, such as a data platform, a data store, etc. For example, a schema may define a data structure comprising an ordered set of data fields that each have a respective field identifier (e.g., a name) and a set of parameters related to the field's value (e.g., a data type, a unit of measure, etc.). In such an example, the ingested data may be thought of as a sequence of data records, where each respective data record includes a respective snapshot of values for the defined set of fields. The purpose of a schema is to define a clear contract between systems to help maintain data quality, which indicates the degree to which data is consistent and semantically correct.

In some implementations, data ingestion system 302 may also be configured to map and transform different types of asset-related data to different schemas. For instance, if the asset-related data received from different data sources is to be input into different types of data analytics operations that have different input formats, it may be advantageous to map and transform such asset-related data received from the different data sources to different schemas.

As part of the transformation stage, data ingestion system 302 may also be configured to perform various other quality checks on the asset-related data before passing it to platform interface system 304. For example, data ingestion system 302 may assess the reliability (or "health") of certain ingested data and take certain actions based on this reliability, such as dropping any unreliable data. As another example, data ingestion system 302 may "de-dup" certain ingested data by comparing it against data that has already been received by platform 300 and then ignoring or dropping duplicative data. As yet another example, data ingestion system 302 may determine that certain ingested data is related to data already stored in the platform's data stores (e.g., a different version of the same data) and then merge the ingested data and stored data together into one data structure or record. Data ingestion system 302 may perform other types of quality checks as well.

It should also be understood that certain data ingested by data ingestion system 302 may not be transformed to a predefined schema (i.e., it is possible that certain ingested data will be "passed through" without performing any transformation on the data), in which case platform 300 may operate on this ingested data as it exists in its original data structure.

As noted above, in some embodiments, data ingestion system 302 may also include an "enhancement" stage where data ingestion system 302 enhances the ingested data before passing it to platform interface system 304. In this respect, data ingestion system 302 may enhance the ingested data in various manners. For instance, data ingestion system 302 may supplement the ingested data with additional asset-related data that is derived by and/or otherwise accessible to platform 300. Such additional data may take various forms. As one example, if the ingested data comprises sensor data, data ingestion system 302 may be configured to supplement the sensor data with "roll-up" data and/or "features" data that is derived from the sensor data. As another possible example, data ingestion system 302 may generate and append certain "enrichments" to the ingested data, examples of which are described in U.S. application Ser. No. 16/004,652, which is incorporated by reference herein in its entirety. Data ingestion system 302 may enhance the ingested data in other manners as well.

After data ingestion system 302 has performed any appropriate transformation and/or enhancement operations on the ingested data, it may pass the ingested data to platform interface system 304, which may be configured to receive data from data ingestion system 302, store the received data in one or more of data stores 310, and make the data available for consumption by the other functional systems of platform 300—including data analysis system 306 and/or front-end system 308. In this respect, the function of passing the ingested data from data ingestion system 302 to platform interface system 304 may take various forms.

According to an example implementation, data ingestion system 302 may begin by categorizing the ingested data into separate data categories (or "domains") that are to be consumed separately by the platform's other functional systems. In turn, data ingestion system 302 may publish the data within each category to a corresponding interface (e.g., an API or the like) that is provided by platform interface system 304. However, it should be understood that other approaches for passing the ingested data from data ingestion system 302 to platform interface system 304 may be used as well, including the possibility that data ingestion system 302 may simply publish the ingested data to a given interface of platform interface system 304 without any prior categorization of the ingested data.

After platform interface system 304 receives the ingested data from data ingestion system 302, platform interface system 304 may cause that data to be stored at the appropriate data stores 310 within platform 300. For instance, in the event that platform interface system 304 is configured to receive different categories of ingested data, platform interface system 304 may be configured store data from a first category into a first data store 310, store data from a second category into a second data store 310, and so on. In addition, platform interface system 304 may store an archival copy of the ingested data into an archival data store 310. Platform interface system 304 may store the ingested data in other manners as well.

After receiving the ingested data from data ingestion system 302, platform interface system 304 may also make the ingested data available for consumption by the platform's other functional systems—including data analysis system 306 and front-end system 308. In this respect, platform interface system 304 may make the ingested data available for consumption in various manners, including through the use of message queues or the like.

After consuming data from platform interface system 304, data analysis system 306 may generally function to perform data analytics operations on such data and then pass the results of those data analytics operations back to platform interface system 304. These data analytics operations performed by data analysis system 306 may take various forms.

As one possibility, data analysis system 306 may create and/or execute predictive models related to asset operation based on asset-related data received from one or more data sources, such as predictive models that are configured to predict occurrences of failures at an asset. One example of a predictive model that may be created and executed by data analysis system 306 is described in U.S. application Ser. No. 14/732,258, which is incorporated by reference herein in its entirety.

As another possibility, data analysis system 306 may create and/or execute models for detecting anomalies in asset-related data received from one or more data sources. Some examples of anomaly detection models that may be created and executed by data analysis system 306 are described in U.S. application Ser. Nos. 15/367,012 and 15/788,622, which are incorporated by reference herein in their entirety.

As yet another possibility, data analysis system 306 may be configured to create and/or execute other types of data analytics programs based on asset-related data received from one or more data sources, examples of which include data analytics programs that evaluate asset-related data using a set of predefined rules (e.g., threshold-based rules), data analytics programs that generate predictive recommendations, data analytics programs that perform noise filtering, and data analytics programs that perform image analysis, among other possibilities.

The data analytics operations performed by data analysis system 306 may take various other forms as well.

Further, it should be understood that some of the data analytics operations discussed above may involve the use of machine learning techniques, examples of which may include regression, random forest, support vector machines (SVM), artificial neural networks, Naïve Bayes, decision trees, dimensionality reduction, k-nearest neighbor (kNN), gradient boosting, clustering, and association, among other possibilities.

As discussed above, after performing its data analytics operations, data analysis system 306 may then pass the results of those operations back to platform interface system 304, which may store the results in the appropriate data store 310 and make such results available for consumption by the platform's other functional systems—including data analysis system 306 and front-end system 308.

In turn, front-end system 308 may generally be configured to drive front-end applications that may be presented to a user via a client station (e.g., client station 106A). Such front-end applications may take various forms. For instance, as discussed above, some possible front-end applications for platform 300 may include an asset performance management application, an asset fleet management application, a service optimization application, and/or an asset dealer operations application, among other possibilities.

In practice, front-end system 308 may generally function to access certain asset-related data from platform interface system 304 that is to be presented to a user as part of a front-end application and then provide such data to the client station along with associated data and/or instructions that define the visual appearance of the front-end application. Additionally, front-end system 308 may function to receive user input that is related to the front-end applications for platform 300, such as user requests and/or user data. Additionally yet, front-end system 308 may support a software development kit (SDK) or the like that allows a user to create customized front-end applications for platform 300. Front-end system 308 may perform other functions as well.

Platform 300 may also include other functional systems that are not shown. For instance, although not shown, platform 300 may include one or more additional functional systems that are configured to output asset-related data and/or instructions for receipt by other output systems, such as third-party data platforms, assets, work-order systems, parts-ordering systems, or the like.

One of ordinary skill in the art will appreciate that the example platform shown in FIGS. 2-3 is but one example of a simplified representation of the structural components and/or functional systems that may be included in a platform, and that numerous others are also possible. For instance, other platforms may include structural components and/or functional systems not pictured and/or more or less of the pictured structural components and/or functional systems. Moreover, a given platform may include multiple, individual platforms that are operated in concert to perform the operations of the given platform. Other examples are also possible.

III. Example Asset

As discussed above with reference to FIG. 1, asset data platform 102 may be configured to perform functions to facilitate the monitoring, analysis, and/or management of various types of assets, examples of which may include transport vehicles (e.g., locomotives, aircrafts, passenger vehicles, trucks, ships, etc.), equipment for construction, mining, farming, or the like (e.g., excavators, bulldozers, dump trucks, earth movers, etc.), manufacturing equipment (e.g., robotics devices, conveyor systems, and/or other assembly-line machines), electric power generation equipment (e.g., wind turbines, gas turbines, coal boilers), petroleum production equipment (e.g., gas compressors, distillation columns, pipelines), and data network nodes (e.g., personal computers, routers, bridges, gateways, switches, etc.), among other examples.

Broadly speaking, an asset may comprise a combination of one or more electrical, mechanical, electromechanical, and/or electronic components that are designed to perform one or more tasks. Depending on the type of asset, such components may take various forms. For instance, a transport vehicle may include an engine, a transmission, a drivetrain, a fuel system, a battery system, an exhaust system, a braking system, a generator, a gear box, a rotor, and/or hydraulic systems, which work together to carry out the tasks of a transport vehicle. However, other types of assets may include other various other types of components.

Figure 4:
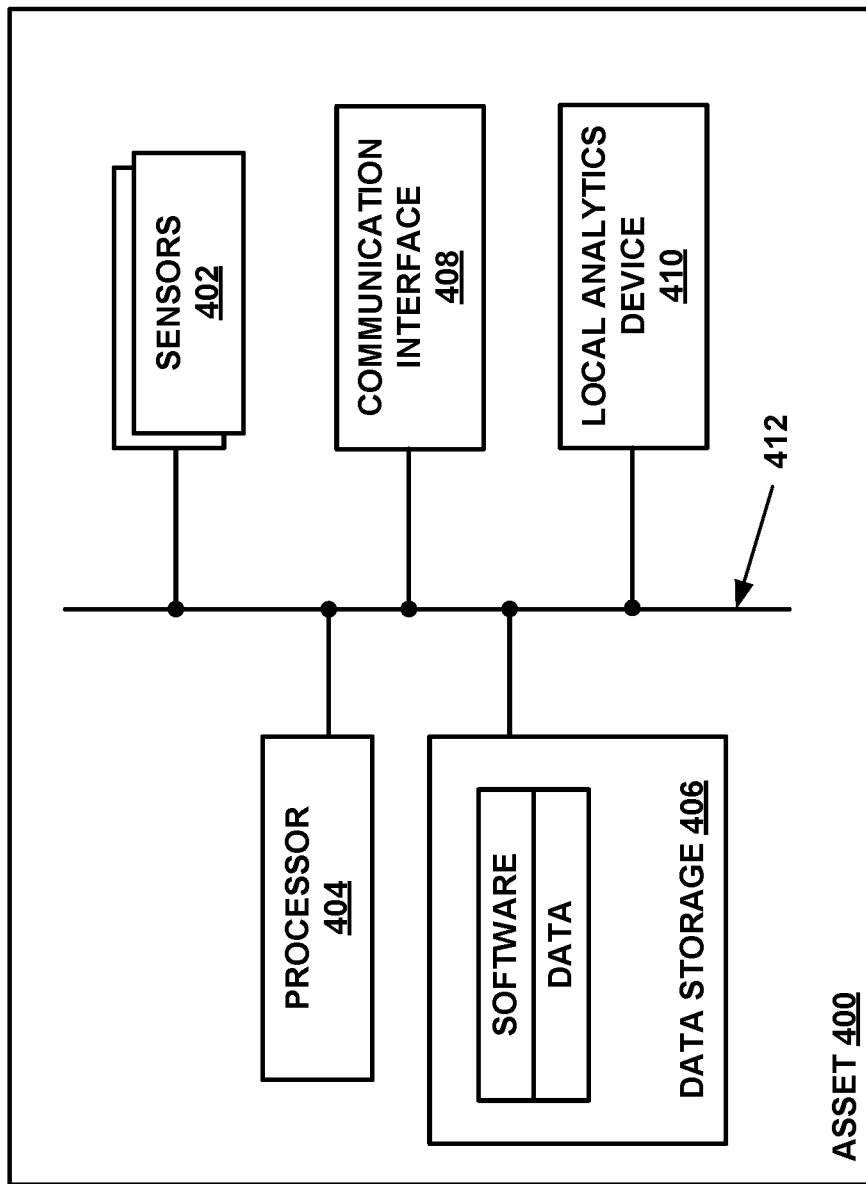
FIG. 4 depicts a simplified block diagram of the on-board components of an example asset.

In addition to the aforementioned components, an asset may also be equipped with a set of on-board components that enable the asset to capture and report operating data. To illustrate, FIG. 4 is simplified block diagram showing some on-board components for capturing and reporting operating data that may be included within or otherwise affixed to an example asset 400. As shown, these on-board components may include sensors 402, a processor 404, data storage 406, a communication interface 408, and perhaps also a local analytics device 410, all of which may be communicatively coupled by a communication link 412 that may take the form of a system bus, a network, or other connection mechanism.

In general, sensors 402 may each be configured to measure the value of a respective operating parameter of asset 400 and then output data that indicates the measured value of the respective operating parameter over time. In this respect, the operating parameters of asset 400 that are measured by sensors 402 may vary depending on the type of asset, but some representative examples may include speed, velocity, acceleration, location, weight, temperature, pressure, friction, vibration, power usage, throttle position, fluid usage, fluid level, voltage, current, magnetic field, electric field, presence or absence of objects, current position of a component, and power generation, among many others.

In practice, sensors 402 may each be configured to measure the value of a respective operating parameter continuously, periodically (e.g., based on a sampling frequency), and/or in response to some triggering event. In this respect, each sensor 402 may have a respective set of operating parameters that defines how the sensor performs its measurements, which may differ on a sensor-by-sensor basis (e.g., some sensors may sample based on a first frequency, while other sensors sample based on a second, different frequency). Similarly, sensors 402 may each be configured to output data that indicates the measured value of its respective operating parameter continuously, periodically (e.g., based on a sampling frequency), and/or in response to some triggering event.

Based on the foregoing, it will be appreciated that sensors 402 may take various different forms depending on the type of asset, the type of operating parameter being measured, etc. For instance, in some cases, a sensor 402 may take the form of a general-purpose sensing device that has been programmed to measure a particular type of operating parameter. In other cases, a sensor 402 may take the form of a special-purpose sensing device that has been specifically designed to measure a particular type of operating parameter (e.g., a temperature sensor, a GPS receiver, etc.). In still other cases, a sensor 402 may take the form of a special-purpose device that is not primarily designed to operate as a sensor but nevertheless has the capability to measure the value of an operating parameter as well (e.g., an actuator). Sensors 402 may take other forms as well.

Processor 404 may comprise one or more processor components, such as general-purpose processors, special-purpose processors, programmable logic devices, controllers, and/or any other processor components now known or later developed. In turn, data storage 406 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc.

As shown in FIG. 4, data storage 406 may be arranged to contain executable program instructions (i.e., software) that cause asset 400 to perform various functions related to capturing and reporting operating data, along with associated data that enables asset 400 to perform these operations. For example, data storage 406 may contain executable program instructions that cause asset 400 to obtain sensor data from sensors 402 and then transmit that sensor data to another computing system (e.g., asset data platform 102). As another example, data storage 406 may contain executable program instructions that cause asset 400 to evaluate whether the sensor data output by sensors 402 is indicative of any abnormal conditions at asset 400 (e.g., by applying logic such as threshold-based rules to the measured values output by sensors 402), and then if so, to generate abnormal-condition data that indicates occurrences of abnormal conditions. The executable program instructions and associated data stored in data storage 406 may take various other forms as well.

Communication interface 408 may be configured to facilitate wireless and/or wired communication between asset 400 and various computing systems, including an asset data platform such as asset data platform 102. As such, communication interface 408 may take any suitable form for carrying out these functions, examples of which may include a chipset and antenna adapted to facilitate wireless communication, an Ethernet interface, a serial bus interface (e.g., Firewire, USB 2.0, etc.), and/or any other interface that provides for wireless and/or wired communication. Communication interface 408 may also include multiple communication interfaces of different types. Other configurations are possible as well. It should also be understood that asset 400 may not be equipped with its own on-board communication interface.

In some circumstances, it may also be desirable to perform certain data analytics operations locally at asset 400, rather than relying on a central platform to perform data analytics operations. Indeed, performing data analytics operations locally at asset 400 may reduce the need to transmit operating data to a centralized platform, which may reduce the cost and/or delay associated with performing data analytics operations at the central platform and potentially also increase the accuracy of certain data analytics operations, among other advantages.

In this respect, in some cases, the aforementioned on-board components of asset 400 (e.g., processor 404 and data storage 406) may provide sufficient computing power to locally perform data analytics operations at asset 400, in which case data storage 406 may be provisioned with executable program instructions and associated program data for performing the data analytics operations. However, in other cases, the aforementioned on-board components of asset 400 (e.g., processor 404 and/or data storage 406) may not provide sufficient computing power to locally perform certain data analytics operations at asset 400. In such cases, asset 400 may also optionally be equipped with local analytics device 410, which may comprise a computing device that is capable of performing data analytics operations and other complex operations that go beyond the capabilities of the asset's other on-board components. In this way, local analytics device 410 may generally serve to expand the on-board capabilities of asset 400.

Figure 5:
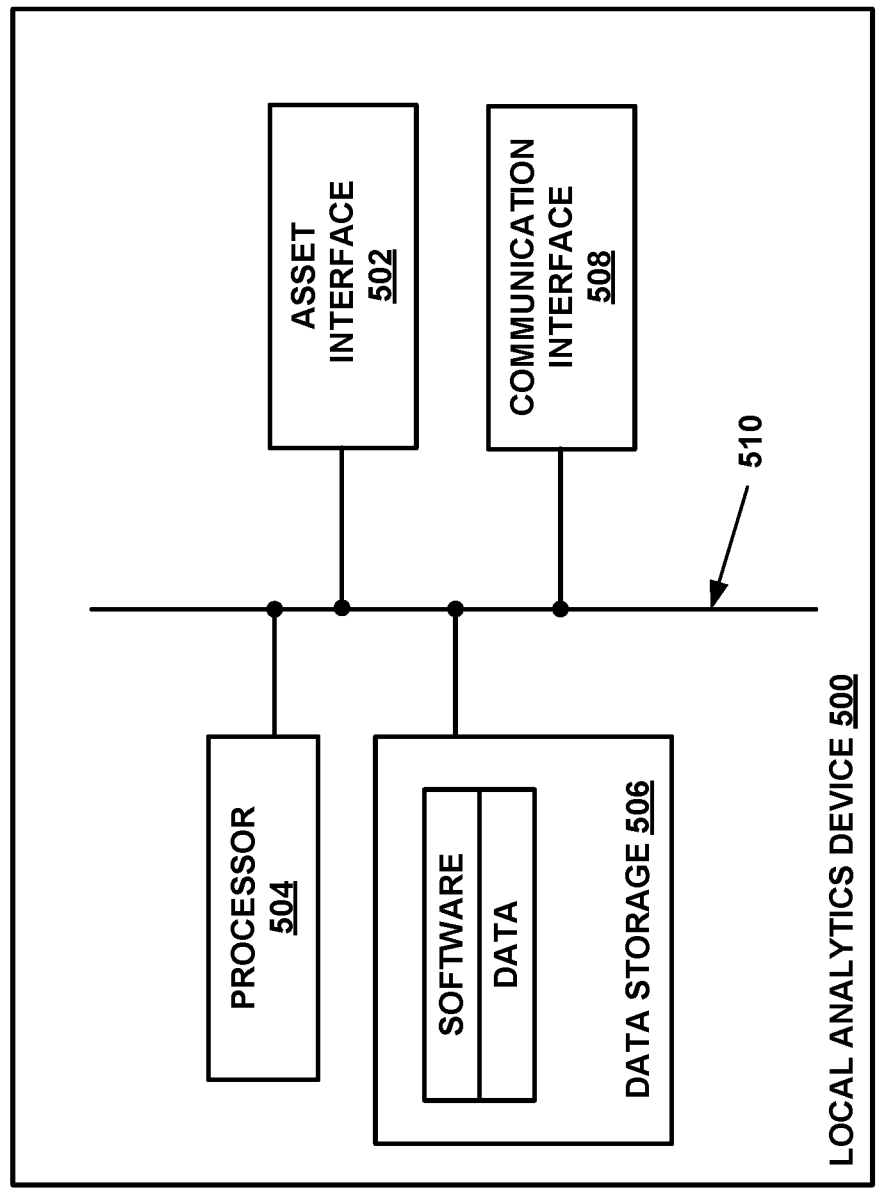
FIG. 5 depicts a simplified block diagram of an example local analytics device.

FIG. 5 illustrates a simplified block diagram showing some components that may be included in an example local analytics device 500. As shown, local analytics device 500 may include an asset interface 502, a processor 504, data storage 506, and a communication interface 508, all of which may be communicatively coupled by a communication link 510 that may take the form of a system bus, a network, or other connection mechanism.

Asset interface 502 may be configured to couple local analytics device 500 to the other on-board components of asset 400. For instance, asset interface 502 may couple local analytics device 500 to processor 404, which may enable local analytics device 500 to receive data from processor 404 (e.g., sensor data output by sensors 402) and to provide instructions to processor 404 (e.g., to control the operation of asset 400). In this way, local analytics device 500 may indirectly interface with and receive data from other on-board components of asset 400 via processor 404. Additionally or alternatively, asset interface 502 may directly couple local analytics device 500 to one or more sensors 402 of asset 400. Local analytics device 500 may interface with the other on-board components of asset 400 in other manners as well.

Processor 504 may comprise one or more processor components that enable local analytics device 500 to execute data analytics programs and/or other complex operations, which may take the form of general-purpose processors, special-purpose processors, programmable logic devices, controllers, and/or any other processor components now known or later developed. In turn, data storage 506 may comprise one or more non-transitory computer-readable storage mediums that enable local analytics device 500 to execute data analytics programs and/or other complex operations, examples of which may include volatile storage mediums such as random-access memory, registers, cache, etc. and non-volatile storage mediums such as read-only memory, a hard-disk drive, a solid-state drive, flash memory, an optical-storage device, etc.

As shown in FIG. 5, data storage 506 may be arranged to contain executable program instructions (i.e., software) that cause local analytics device 500 to perform data analytics operations and/or other complex operations that go beyond the capabilities of the asset's other on-board components, as well as associated data that enables local analytics device 500 to perform these operations.

Communication interface 508 may be configured to facilitate wireless and/or wired communication between local analytics device 500 and various computing systems, including an asset data platform such as asset data platform 102. In this respect, local analytics device 500 may communicate the results of its operations to an asset data platform via communication interface 508, rather than via an on-board communication interface of asset 400. Further, in circumstances where asset 400 is not be equipped with its own on-board communication interface, asset 400 may use communication interface 508 to transmit operating data to an asset data platform. As such, communication interface 508 may take any suitable form for carrying out these functions, examples of which may include a chipset and antenna adapted to facilitate wireless communication, an Ethernet interface, a serial bus interface (e.g., Firewire, USB 2.0, etc.), and/or any other interface that provides for wireless and/or wired communication. Communication interface 508 may also include multiple communication interfaces of different types. Other configurations are possible as well.

In addition to the foregoing, local analytics device 500 may also include other components that can be used to expand the on-board capabilities of an asset. For example, local analytics device 500 may optionally include one or more sensors that are configured to measure certain parameters, which may be used to supplement the sensor data captured by the asset's on-board sensors. Local analytics device 500 may include other types of components as well.

Returning to FIG. 4, although not shown, asset 400 may also be equipped with hardware and/or software components that enable asset 400 to adjust its operation based on asset-related data and/or instructions that are received at asset 400 (e.g., from asset data platform 102 and/or local analytics device 410). For instance, as one possibility, asset 400 may be equipped with one or more of an actuator, motor, value, solenoid, or the like, which may be configured to alter the physical operation of asset 400 in some manner based on commands received from processor 404. In this respect, data storage 406 may additionally be provisioned with executable program instructions that cause processor 404 to generate such commands based on asset-related data and/or instructions received via communication interface 408. Asset 400 may be capable of adjusting its operation in other manners as well.

Further, although not shown, asset 400 may additionally include one or more interfaces that provide connectivity with external user-interface equipment (sometimes referred to as "peripherals"), such as a keyboard, a mouse or trackpad, a display screen, a touch-sensitive interface, a stylus, a virtual-reality headset, speakers, etc., which may allow for direct user interaction with the on-board components of asset 400.

One of ordinary skill in the art will appreciate that FIGS. 4-5 merely shows one example of the components of an asset, and that numerous other examples are also possible. For instance, the components of an asset may include additional components not pictured, may have more or less of the pictured components, and/or the aforementioned components may be arranged and/or integrated in a different manner. Further, one of ordinary skill in the art will appreciate that two or more of the components of asset 400 may be integrated together in whole or in part. Further yet, one of ordinary skill in the art will appreciate that at least some of these components of asset 400 may be affixed or otherwise added to asset 400 after it has been placed into operation.

IV. Example Operations

As described above, a data analytics platform may be configured to create and deploy an anomaly detection model that comprises (1) a model object that is used to score multivariate observation data originating from a given data source (e.g., multivariate operating data originating from an asset) and (2) a set of anomaly thresholds that are used to evaluate the scored observation data for purposes of determining whether anomalies exist in the multivariate observation data. Such an anomaly detection model may take various forms.

As one possible example, an anomaly detection model may be based on principal component analysis (PCA), which is a technique that uses linear transformations to transform multivariate data from a first coordinate space defined by an original set of correlated variables to a second coordinate space comprising a set of orthogonal dimensions that are defined by a new set of uncorrelated variables. In such an example, the model object that is used to score multivariate observation data takes the form of a "projection matrix" (or an "Eigenspace"), which may define a reduced-dimensionality PCA coordinate space having dimensions referred to as "Eigenvectors" or "principal components" (PCs), and the function of scoring a set of multivariate data points using the projection matrix may take various forms.

In one implementation, the data analytics platform may begin the scoring operation for a given data point (e.g., a given vector of sensor measurements) by inputting the data point into the projection matrix and thereby transforming the data point from its original coordinate space to the PCA coordinate space defined by the projection matrix. As part of this transformation, the data analytics platform may also standardize and/or modify the value of the data point in one or more dimensions of the PCA coordinate space. In this respect, functions that may be carried out in order to standardize and/or modify the value of the data point in one or more dimensions of the PCA coordinate space may take various forms, and some examples of these functions are disclosed in U.S. application Ser. Nos. 15/367,012 and 15/788,622, which are incorporated herein by reference in their entirety. After the data point has been transformed to the PCA coordinate space, the data analytics platform may complete the scoring operation for the data point by inversely transforming the data point from the PCA coordinate space back to the original coordinate space—which produces a "predicted" version of the data point—and then determining a difference value between original and predicted versions of the data point for each variable included in the original coordinate space of the multivariate data, which may be considered the multivariate "score" value for the data point.

The data analytics platform may perform a similar scoring operation for each data point in the set of multivariate data points, which may result in a respective multivariate "score" value being determined for each data point in the set of multivariate data points. In turn, the data analytics platform may then evaluate the multivariate "score" values for the set of multivariate data points using a set of anomaly thresholds for the PCA-based anomaly detection model, in order to determine whether any anomalies exist in the set of multivariate data points. In this respect, the set of anomaly thresholds for the PCA-based anomaly detection model may include a respective upper anomaly threshold and/or a respective lower anomaly threshold for each of a given set of variables included in the original coordinate space of the multivariate data, where (1) an "upper" anomaly threshold is a threshold at which the amount of difference between original and predicted versions of a data point in the "positive" direction is considered to be anomalous and (2) a "lower" anomaly threshold is a threshold at which the amount of difference between original and predicted versions of a data point in the "negative" direction is considered to be anomalous.

Further, the function of using the set of anomaly thresholds for the PCA-based anomaly detection model to determine whether any anomalies exist in the set of multivariate data may take various forms. In one implementation, the data analytics platform may begin by evaluating each data point's multivariate "score" value to determine whether that multivariate "score" value violates any anomaly threshold in the set of anomaly thresholds for the PCA-based anomaly detection model (e.g., by having a difference value for at least one variable that exceeds an upper and/or lower anomaly threshold for that variable). In this respect, each data point having a multivariate "score" value that is determined to violate at least one anomaly threshold in the set of anomaly thresholds for the PCA-based anomaly detection model may be referred to as an "exceedance."

In turn, the data analytics platform may determine whether the exceedances detected in the set of multivariate data amount to an anomaly occurrence. In this respect, the criteria used by the data analytics platform to determine whether the exceedances detected in the set of multivariate data amount to an anomaly occurrence may take various forms. As one example, the data analytics platform may determine that an anomaly has occurred when a threshold extent of exceedances has occurred in any sequence of data points within a given window, which may be referred to as a "sliding window" approach. As another example, the data analytics platform may determine that an anomaly has occurred each time any individual exceedance is detected. The criteria used by the data analytics platform to determine whether the exceedances detected in the set of multivariate data amount to an anomaly occurrence may take other forms as well.

It should be understood that the above discussion of a PCA-based anomaly detection model is merely being provided for purposes of illustration and explanation, and that an anomaly detection model may take various other forms as well—including an anomaly detection model based on a regression technique other than PCA.

As further described above, existing approaches of defining anomaly thresholds for anomaly detection models such as these are based on a combination of non-anomalous training data and predefined tolerances that are premised on human assumptions, which tends to produce overly-conservative anomaly thresholds that cause an anomaly detection model to miss certain anomalies in the observation data originating from a given data source (i.e., "false negatives"). To help improve upon these and other problems with existing approaches, disclosed herein is a new process for defining a set of anomaly thresholds for such an anomaly detection model, which (1) uses "training data" that is not expected to have anomalies to establish a starting point for the set of anomaly thresholds and then (2) uses "test data" that may have anomalies to refine the set of anomaly thresholds. In practice, the disclosed process may be used to define a set of anomaly thresholds for any type of anomaly detection model that comprises a model object and a set of anomaly thresholds, including but not limited to anomaly detection models based on regression techniques such as PCA, kernel-based methods, autoencoders, or autoregression, among other examples.

In practice, the disclosed process for defining a set of anomaly thresholds for an anomaly detection model may be carried out by any computing system that has access to both training data and test data for a given data source and has sufficient computing capability to perform data analytics operations, where such a computing system may generally be referred to herein as a "data analytics platform." For instance, as one possibility, the data analytics platform that carries out the disclosed process may take the form of a centralized asset data platform that has access to both training data and test data, such as asset data platform 102 in FIG. 1. As another possibility, the data analytics platform that carries out the disclosed process may take the form of a local analytics device of an asset, such as asset 104A in FIG. 1. The data analytics platform that carries out the disclosed process may take various other forms as well.

Further, in some embodiments, it is possible that the responsibility for carrying out the functions of the disclosed process could be distributed across multiple data analytics platforms. For example, in one such embodiment, an asset's local analytics device may be configured to carry out the functions of the disclosed process that are based on training data, while a centralized asset data platform (e.g., asset data platform 102) may be configured to carry out the functions of the disclosed process that are based on test data (e.g., refining the set of anomaly thresholds). The functions of the disclosed process could be distributed across multiple data analytics platforms in other manners as well.

Figure 6:
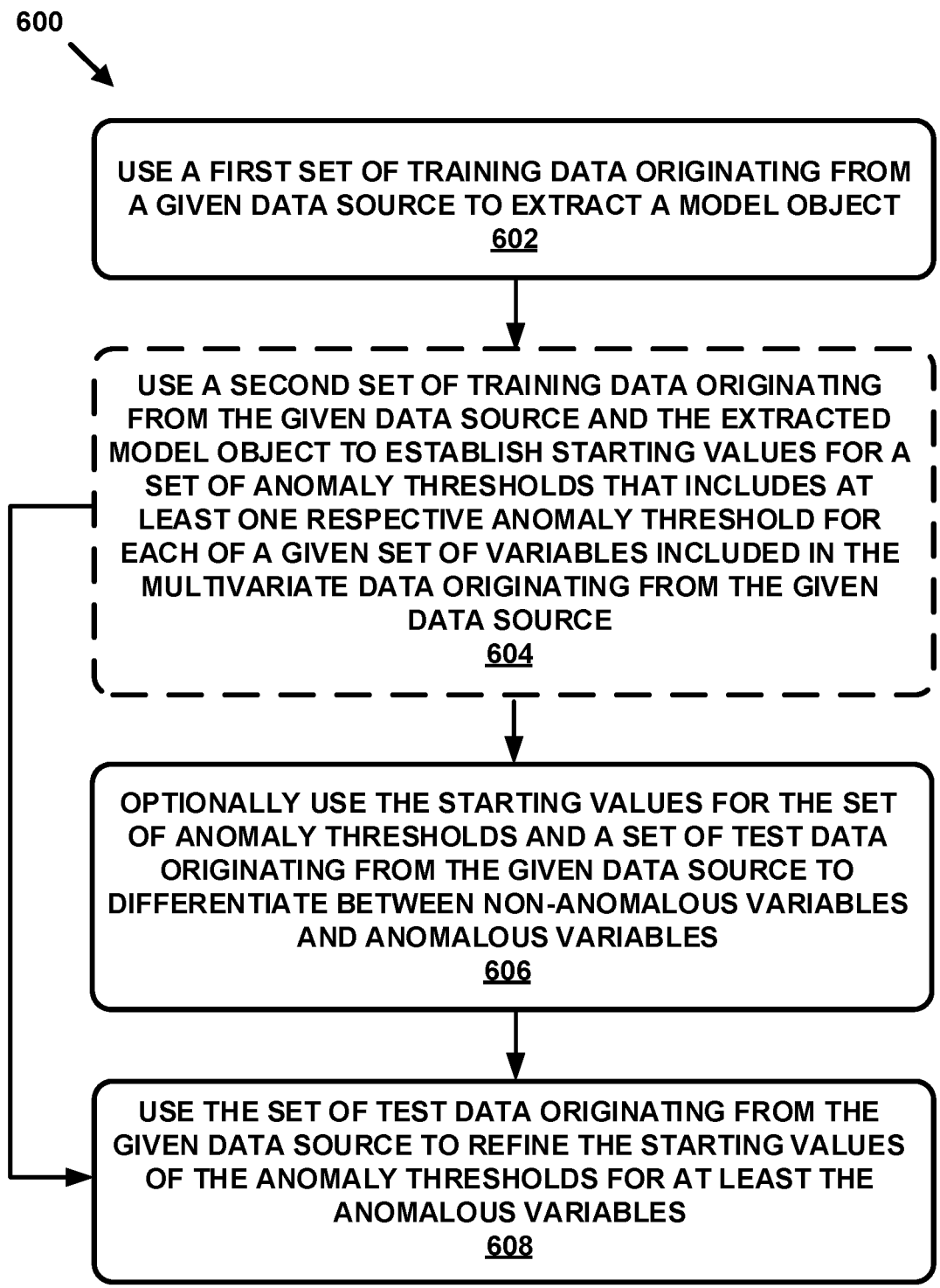
FIG. 6. is a flow diagram showing some example operations that may be included in the disclosed process for defining a set of anomaly thresholds for an anomaly detection model.

Referring now to FIG. 6, a functional block diagram 600 is provided that illustrates one example of high-level operations that may be included as part of the disclosed process for defining a set of anomaly thresholds for an anomaly detection model that is configured to detect anomalies in multivariate data originating from a given data source. For the purposes of illustration, the example operations are described as being carried out by asset data platform 102. However, it should be understood that data analytics platforms other than asset data platform 102 may perform the example operations. Likewise, it should be understood that the disclosed process is merely described in this manner for the sake of clarity and explanation and that the disclosed process may be implemented in various other manners, including the possibility that example functions may be added, removed, rearranged into different orders, grouped together into different phases, and/or not grouped together into phases at all.

In practice, the given data source—and the multivariate data originating from the given data source—may take various forms. As one possible example, the given data source may take the form of an asset, and the multivariate data originating from the asset may take the form of multivariate sensor data captured by the asset. In this respect, as discussed above, an asset may be equipped with a set of sensors that each serve to capture a time-sequence of values for a respective operating parameter of the asset (e.g., speed, velocity, acceleration, location, weight, temperature, pressure, friction, vibration, power usage, throttle position, fluid usage, fluid level, voltage, current, magnetic field, electric field, presence or absence of objects, current position of a component, and power generation, etc.), where each such value corresponds to a point of time at which the value was measured. As such, the sensor data originating from the asset may take the form of a sequence of time-series multivariate data, where each respective data point in the sequence comprises a vector of values measured by the asset's sensors at a respective point in time. It is also possible that the asset may derive other time-series data based on the asset's sensor data, in which case this derived data could also be included in the sequence of time-series multivariate data originating from the asset.

The given data source and the multivariate data originating from the given data source may take various forms as well.

As shown in FIG. 6, the disclosed process may involve: (1) at block 602, using a first set of training data originating from the given data source to extract a model object for an anomaly detection model; (2) at block 604, using a second set of training data originating from the given data source and the extracted model object to establish starting values for a set of anomaly thresholds that includes at least one respective anomaly threshold for each of a given set of variables included in the multivariate data originating from the given data source; (3) at block 606, optionally using the starting values for the set of anomaly thresholds and a set of test data originating from the given data source to differentiate between the variables included within the given set of variables that are unlikely to have anomalous values (which may be referred to herein as "non-anomalous variables") and the remaining variables in the given set of variables that may have anomalous values (which may be referred to herein as "anomalous variables"); and (4) at block 608, using the set of test data originating from the given data source to refine the starting values of the anomaly thresholds for at least the anomalous variables. As described herein, each of these operations may take various forms and may be carried out in various manners.

For instance, at block 602, asset data platform 102 may use a first set of training data originating from the given data source to extract a model object for an anomaly detection model. In this respect, the first set of training data that is used to extract the model object may be obtained in various manners. As one possibility, asset data platform 102 may have previously received and stored data originating from the give data source that has been labeled as non-anomalous training data, in which case asset data platform 102 may obtain the first set of training data from one of the platform's data stores (e.g., data stores 310). As another possibility, asset data platform 102 may obtain the first set of training data from the given data source itself. In this respect, the data that is obtained from the given data source may already be designated as non-anomalous training data, or asset data platform 102 may determine that the obtained data comprises non-anomalous training data after receiving the data from the given data source. As yet another possibility, asset data platform 102 may obtain the first set of training data from another external data source that has access to non-anomalous training data originating from the given data source. Asset data platform 102 may obtain the first set of training data in various other manners as well.

Further, depending on the type of anomaly detection model being created, the model object that is extracted—and the process of extracting the model object—may take various forms. As one possible implementation, asset data platform 102 may begin the process of extracting the model object by deriving a set of training metrics from the first set of training data. In this respect, the derived set of training metrics may take various forms, examples of which may include a mean, a variance, a max, a min, and/or a correlation matrix, among various other examples. In turn, asset data platform 102 may use the calculated set of training metrics to extract the model object for the anomaly detection model being created. For instance, in an example where the anomaly detection model comprises a PCA-based anomaly detection model, asset data platform 102 may extract a model object that takes the form of a projection matrix by performing PCA on a correlation matrix that is either included within the calculated set of training metrics or is derived from the calculated set of training metrics. The model object may take other forms and be extracted in other manners as well.

At block 604, after extracting the model object, asset data platform 102 may use a second set of training data and the extracted model object (e.g., a projection matrix) to establish starting values for a set of anomaly thresholds for the anomaly detection model. In this respect, the second set of training data that is used to extract the model object may be obtained in various manners, including but not limited to any of the manners described above with respect to the first set of training data.

At a high level, the set of anomaly thresholds being defined for the anomaly detection model may include at least one respective anomaly threshold for each of a given set of variables included in the multivariate data originating from the given data source. Such anomaly thresholds may take various forms. In one possible implementation, each anomaly threshold may comprise a threshold multivariate score value produced by the extracted model object at which score values for a given data variable are considered to be anomalous. For instance, for a PCA-based anomaly detection model, each anomaly threshold comprises a threshold multivariate score value at which the amount of difference between data values for a given data variable and the expected values of such data values is considered to be anomalous. In this respect, each data point of a given data variable having a multivariate score value that is determined to violate at least one anomaly threshold in the set of anomaly thresholds may be referred to as an "exceedance." Depending on the type of anomaly detection model being created, the set of anomaly thresholds may take various forms.

According to one example described above, the set of anomaly thresholds may comprise a respective pair of upper and lower anomaly thresholds for each relevant training data variable, where (1) the upper anomaly threshold defines a threshold at which the amount of difference between training data values for a given data variable and the expected values of such training data values in the "positive" direction is considered to be anomalous and (2) the lower anomaly threshold defines a threshold at which the amount of difference between training data values for a given data variable and the expected values of such training data values in the "negative" direction is considered to be anomalous.

According to another example, the set of anomaly thresholds may include only a single anomaly threshold for a given training data variable. In such an example, the single anomaly threshold may serve as the threshold for deviation in either the "positive" or "negative" direction, or in circumstances where a deviation in the given training data variable in one particular direction is not relevant to the occurrence of anomalies, the single anomaly threshold for the given training data variable may serve as the threshold for deviation in only in the other direction. The set of anomaly thresholds for the anomaly detection model may take other forms as well.

Further, depending on the type of anomaly detection model being created, the process of establishing the starting values for the set of anomaly thresholds using the second set of training data and the extracted model object may be carried out in various manners. As one possible implementation, this process may involve (1) "scoring" the second set of training data using the extracted model object for the anomaly detection model and then (2) using the distribution of score values for each variable included in the given set of variables (perhaps along with an optional multiplier) to determine an upper and/or a lower anomaly threshold for the variable. These functions may take various forms.

For instance, in line with the discussion above, the function of "scoring" the second set of training data using the extracted model object may take various forms, which may vary depending on the type of anomaly thresholds model being created. For example, if the anomaly detection model comprises a PCA-based anomaly detection model, the "scoring" operation may involve inputting a multivariate training data point from the second set of training data into a model object (i.e., projection matrix) and thereby transforming the data point from its original coordinate space to the PCA coordinate space defined by the projection matrix. As part of this transformation, asset data platform 102 may also standardize and/or modify the value of the data point in one or more dimensions of the PCA coordinate space. After the training data point has been transformed to the PCA coordinate space, asset data platform 102 may complete the scoring operation for the data point by inversely transforming the data point from the PCA coordinate space back to the original coordinate space, which produces a predicted version of the data point, and then determining a difference value between original and predicted versions of the data point, which may produce a multivariate score for the training data point.

Asset data platform 102 may perform a similar scoring operation for each training data point from the second set of training data, which may result in the determination of a respective difference value for each training data point. These respective difference values—which may collectively be referred to as the "difference signal" (or "residuals") of the multivariate training data points—may then be evaluated to establish starting values for a set of anomaly thresholds. Asset data platform 102 may score the second set of training data in various other manners as well.

After scoring the second set of training data using the extracted model object for the anomaly detection model, asset data platform 102 may then evaluate the respective distribution of score values for each variable in the given set of variables in order to select a respective upper bound value and/or lower bound value for each such variable. This function may take various forms.

As one possibility, this function may involve selecting points within the respective distribution of score values for a given variable that are a given number of standard deviations from the distribution's center point in the "positive" direction (for the upper bound value) and/or the "negative" direction (for the lower bound value). As another possibility, this function may involve selecting the maximum score value for a given variable in the "positive" direction as the upper bound value and/or selecting the maximum score value for the given variable in the "negative" direction as the lower bound value. As yet another possibility, this function may involve selecting the $95^{th}$ percentile statistic of the score values for a given variable as the upper bound value and/or selecting the $5^{th}$ percentile statistic of the score values for the given variable as the lower bound value.

The function of evaluating the respective distribution of score values for a given variable in order to select the upper bound value and/or the lower bound value for the given variable may take various other forms as well, including but not limited to using statistics such as the root-mean square or the mean absolute difference, among other possibilities.

After each given variable's upper bound value and/or the lower bound value has been selected, asset data platform 102 then may either (1) use the selected upper bound value and/or the lower bound value as the starting values for the given variable's upper and/or lower anomaly thresholds or (2) apply a multiplier to increase the selected upper and/or lower bound values for the given variable (e.g., to building in tolerances) and use the resulting values as the starting values for the given variable's upper and/or lower anomaly thresholds. In this respect, whether or not an optional multiplier is applied to increase the selected upper and/or lower bounds for a given variable may depend in part on the approach used to select the upper and/or lower bounds. For example, if the bounds are selected using a smaller number of standard deviations (e.g., 2), then the bounds may be increased with a multiplier to build in a tolerance. On the other hand, if the bounds are selected using a larger number of standard deviations (e.g., 5 or more), then it may not be necessary to further increase the bounds with a tolerance.

Figure 7:
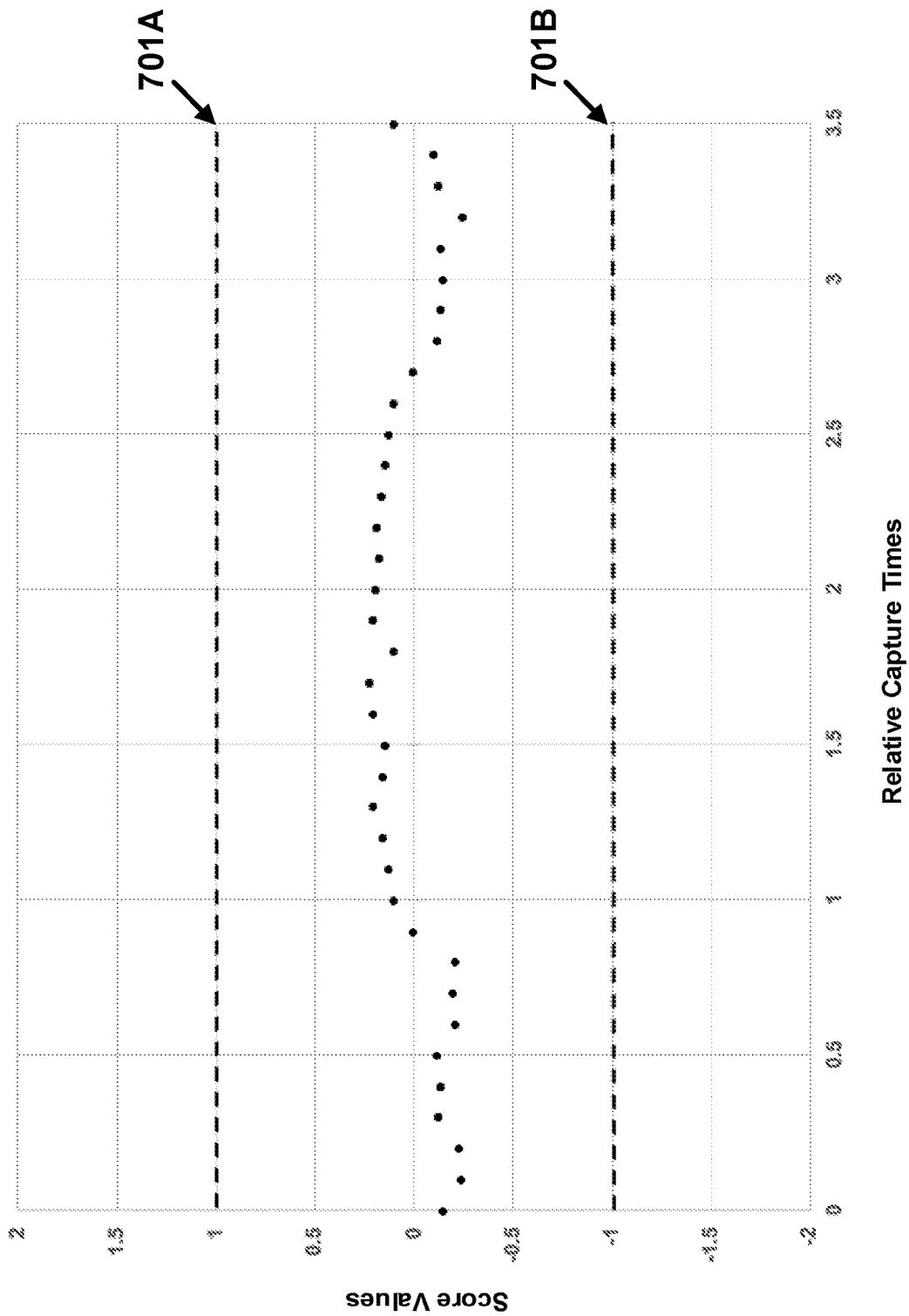
FIG. 7 depicts an example time-series graph of score values for a given variable in the set of training data over a relative captured timeframe.

To help further illustrate process of establishing the starting values for the set of anomaly thresholds, FIG. 7 is a times-series graph that shows example score values for a given variable in the set of variables, which may result from scoring an example set of training data using the extracted model object. In the time-series graph of FIG. 7, the horizontal axis represents the relative capture times of the training data points and the vertical axis represents the score values of the training data points for the given variable (e.g., the differences between the original value of the given variable and the predicted value of the given variable). As shown, the times-series graph includes various training data points captured within a timeframe shown in FIG. 7 (i.e., 0 to 3.5) with score values that are at or near the value of 0 for the given variable. Using the score values of these various training data points, asset data platform 102 may select starting values of the upper and/or lower anomaly thresholds for the given variable. For example, as shown in FIG. 7, asset data platform 102 may select starting value 701A that corresponds to a score value of 1 for the upper anomaly threshold and select starting value 701B that corresponds to a score value of −1 for the lower anomaly threshold. However, it should be understood that these starting values are provided for purposes of illustration and explanation, and that asset data platform 102 may select other starting values for the upper and/or lower anomaly thresholds using any of the techniques described above.

The process of establishing the starting values for the set of anomaly thresholds using the second set of training data and the extracted model object may take various other forms as well.

After establishing the starting values for the set of anomaly thresholds, at block 606, asset data platform 102 may optionally use the starting values for the set of anomaly thresholds and a set of test data originating from the given data source to differentiate between the variables included within the given set of variables that are unlikely to have anomalous values (i.e., non-anomalous variables) and the remaining variables in the given set of variables that may have anomalous values (i.e., anomalous variables). In this respect, the function of differentiating between non-anomalous and anomalous variables in the given set of variables may in turn enable asset data platform 102 to eliminate the non-anomalous variables from the given set of variables before performing the function of refining the starting values for the set of anomaly thresholds, which may lead to a further improvement in the accuracy of the anomaly thresholds defined by the disclosed process.

The set of test data that is used to differentiate between non-anomalous and anomalous variables included within the given set of variables may be obtained in various manners. As one possibility, asset data platform 102 may have previously received and stored data originating from the given data source that has been labeled as test data (i.e., data that may have anomalies), in which case asset data platform 102 may obtain the set of test data from one of the platform's data stores (e.g., data stores 310). As another possibility, asset data platform 102 may obtain the set of test data from the given data source itself. In this respect, the data that is obtained from the given data source may already be designated as test data (i.e., data that may have anomalies), or asset data platform 102 may determine that the obtained data comprises test data after receiving the data from the given data source. As yet another possibility, asset data platform 102 may obtain the set of test data from another external data source that has access to test data originating from the given data source. Asset data platform 102 may obtain the set of test data in various other manners as well.

Further, the process of using the starting values for the set of anomaly thresholds and the set of test data originating from the given data source to differentiate between non-anomalous and anomalous variables included within the given set of variables may take various forms. As one possible implementation, asset data platform 102 may differentiate between non-anomalous and anomalous variables within the given set of variables by performing the following functions for each variable in the given set: (1) tightening the starting value(s) of the variable's upper and/or lower anomaly thresholds by a given amount (e.g., by applying a given multiplier having a value less than 1), (2) applying the tightened value(s) for the variable's upper and/or lower anomaly thresholds to the set of test data, (3) determining an extent of univariate anomalies detected in the set of test data for the variable, (4) comparing the determined extent of univariate anomalies to a threshold value that serves as a dividing line between a de minimis extent of anomalies and a meaningful extent of anomalies, (5) either identifying the variable as non-anomalous if the extent of univariate anomalies detected in the set of test data for the variable is below the threshold or otherwise considering the variable to be anomalous.

Figure 8A:
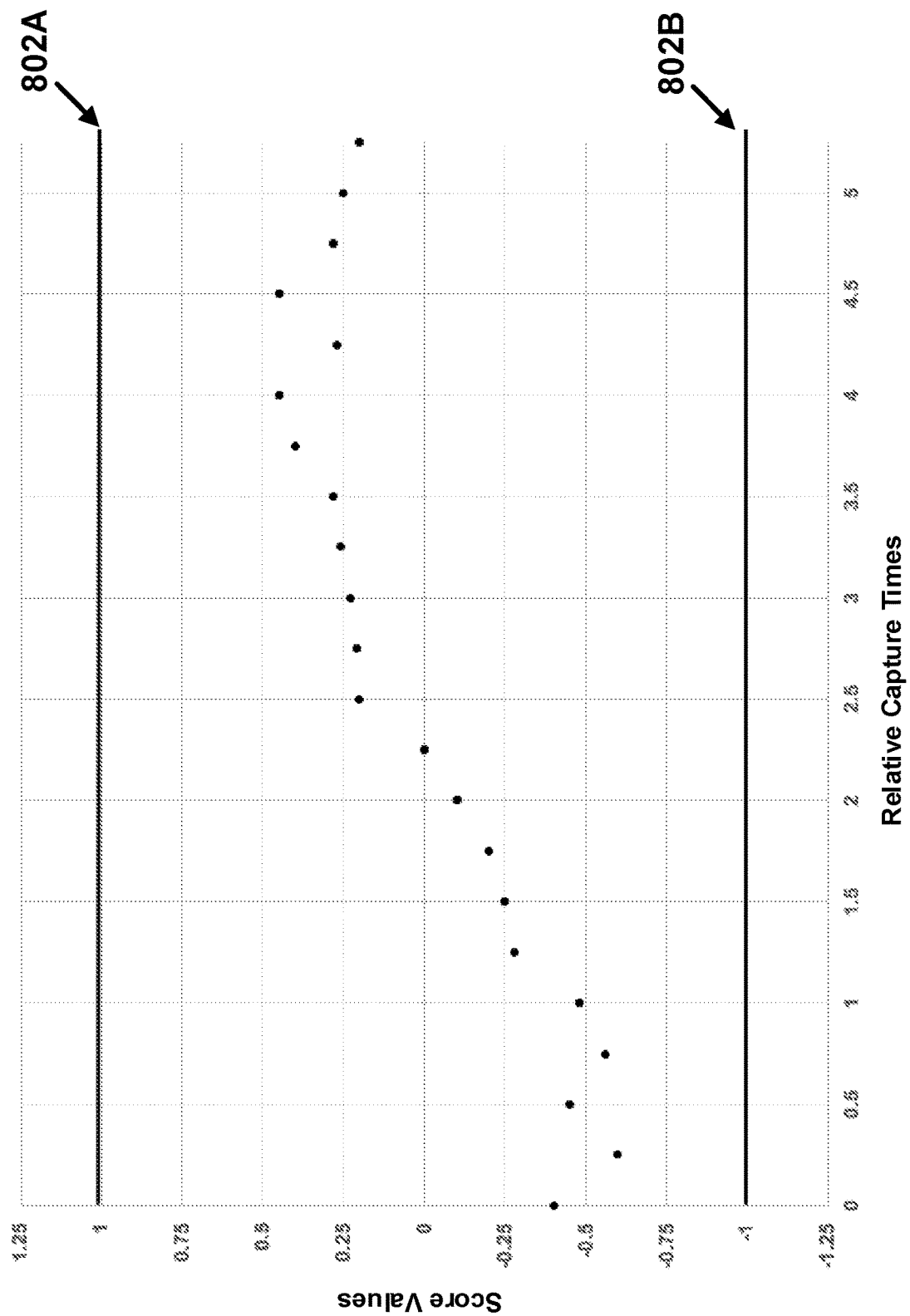
FIG. 8A depicts an example time-series graph of score values for a given variable in the set of test data over a relative captured timeframe.

These example functions will now be described in further detail starting with FIG. 8A, which is a time-series graph that shows example score values for a given variable in the set of variables that may result from scoring an example set of test data using the extracted model object. In the time-series graph of FIG. 8A, the horizontal axis represents the relative capture times of the test data points and the vertical axis represents score values of the test data points for the given variable (e.g., the differences between the original value of the given variable and the predicted value of the given variable). As shown, the time series graph includes various test data points captured within a timeframe shown in FIG. 8A (i.e., 0 to 5), and the score values of these various test data points are all within starting values 802A, 802B for the upper and lower anomaly thresholds. For the purposes of illustration and explanation, starting value 802A is the same as starting value 701A of FIG. 7 (i.e., the score value of 1) selected for the upper anomaly threshold for the given variable, and starting value 802B is the same as starting value 701B of FIG. 7 (i.e., the score value of −1) selected for the lower anomaly threshold for the given variable.

Figure 8B:
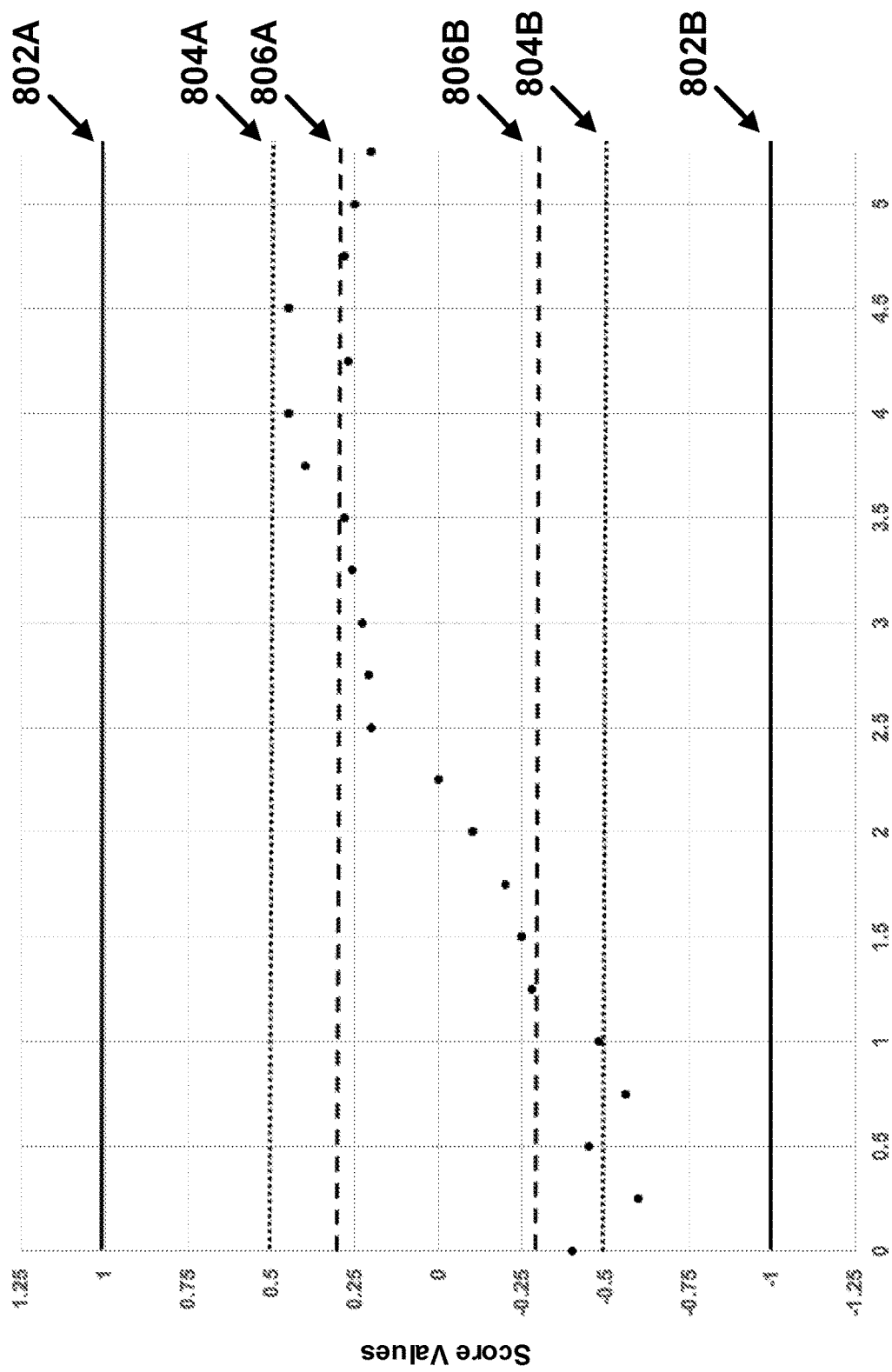
FIG. 8B depicts another example time-series graph of score values for the given variable in the set of test data over the relative captured timeframe.

As noted above, to determine whether the given variable is non-anomalous or anomalous, asset data platform 102 may begin by tightening the starting values 802A, 802B of the given variable's anomaly thresholds by a given amount, which may involve applying a given multiplier having a value less than 1 to the starting values. This function is illustrated in FIG. 8B, which is another time-series graph showing the same score values for the given variable that were included in FIG. 8A, but with the starting values 802A, 802B of the upper and lower anomaly thresholds for the given variable now tightened by a given amount. In particular, FIG. 8B illustrates two different options for tightening the starting values 802A, 802B for the upper and lower anomaly thresholds for the given variable: (1) a first option where asset data platform 102 applies a multiplier value of 0.5 to the starting values 802A, 802B of the upper and lower anomaly thresholds, which may result in tightened values 804A, 804B for the upper and lower anomaly thresholds, and (2) a second option where asset data platform 102 applies a multiplier value of 0.3 to the starting values 802A, 802B of the upper and lower anomaly thresholds, which may result in tightened values 806A, 806B for the upper and lower anomaly thresholds.

While FIG. 8B illustrates two possible examples of multiplier values that may be used to tighten the starting values of a given variable's upper and lower anomaly thresholds, it should be understood that this example is merely provided for purposes of illustration, and that in practice, the particular multiplier value used by asset data platform 102 to tighten the starting values of a given variable's upper and lower anomaly thresholds may take any of various values ranging from 0 to 1. Further, while FIG. 8B shows the same multiplier value being used to tighten both the upper anomaly threshold and lower anomaly threshold, it should be understood that different multiplier values may be used to tighten the upper and lower anomaly thresholds. Further yet, it should be understood that the different multiplier values may be used for different variables included in the set of variables.

Once asset data platform 102 tightens the starting values of the given variable's upper and lower anomaly thresholds using a given multiplier, asset data platform 102 may apply the tightened value(s) for the variable's upper and/or lower anomaly thresholds to the set of test data and determine an extent of univariate anomalies detected in the set of test data for the given variable (e.g., an anomaly percentage for the given variable). In this respect, the criteria that defines whether a univariate anomaly has occurred—as well as the related function of determining an extent of univariate anomalies detected in the test data—may take various forms.

For instance, as one possibility, asset data platform 102 may determine that a univariate anomaly has occurred when a threshold extent of univariate exceedances (i.e., data points having a score value for the given variable that violate one of the given variable's anomaly thresholds) has occurred in any sequence of data points within a given window, which may be referred to as a "sliding window" approach. In this respect, the length of the window may be defined in terms of a particular number of data points (e.g., 50 data points) or a particular amount of time (e.g., an hour, a day, etc.), among other possibilities. As another possibility, asset data platform 102 may determine that a univariate anomaly has occurred each time any individual univariate exceedance is detected. The criteria used by asset data platform 102 to determine whether a univariate anomaly has occurred may take other forms as well.

Based on the foregoing, it will be appreciated that the tightened values of the anomaly thresholds resulting from a multiplier value closer to 1 will generally yield a lower extent of univariate anomalies than the tightened values of the anomaly thresholds resulting from a multiplier value closer to 0. This can be seen with respect to the example score values illustrated in FIG. 8B.

Indeed, as shown in FIG. 8B, the tightened values 804A, 804B of the given variable's upper and lower anomaly thresholds resulting from a multiplier value of 0.5 may lead to the detection of 2 consecutive exceedances at relative capture times of 0.25 and 0.5, but no other exceedances. Thus, if asset data platform 102 is employing an example sliding window approach where a univariate anomaly is detected whenever there are 2 univariate exceedances within a window of 3 consecutive data points, asset data platform 102 may determine that the tightened values 804A, 804B of the given variable's upper and lower anomaly thresholds lead to the detection of 1 window amounting to anomalies out of a total of 20 windows evaluated, for an anomaly percentage of 5%.

On the other hand, as shown in FIG. 8B, the tightened values 806A, 806B of the given variable's upper and lower anomaly thresholds resulting from a multiplier value of 0.3 may yield a detection of 8 total exceedances—5 consecutive exceedances between relative capture times of 0 and 1 and then another 3 exceedances (with one intervening non-exceedance) between relative capture times of 3.75 and 4.5. Thus, if asset data platform 102 is employing an example sliding window approach where a univariate anomaly is detected whenever there are 2 univariate exceedances within a window of 3 consecutive data points, asset data platform 102 may determine that the tightened values 806A, 806B of the given variable's upper and lower anomaly thresholds lead to the detection of 7 windows amounting to anomalies out of a total of 20 windows evaluated, for an anomaly percentage of 35%.

Depending on the particular criteria used to determine whether a univariate anomaly has occurred in the set of test data, the extent of univariate anomalies detected by the tightened values of the given variable's upper and lower anomaly thresholds may take various other forms as well.

After asset data platform 102 has determined the extent of univariate anomalies detected in the set of test data for the given variable, asset data platform 102 may then compare the extent of univariate anomalies to a threshold value that serves as a dividing line between a de minimis extent of anomalies and a meaningful extent of anomalies. This function is illustrated with reference to FIG. 8C, which is a two-dimensional plot that shows the extent of univariate anomalies detected in the set of test data for the given variable when using various different multiplier values to tighten the starting values of the given variable's upper and lower anomaly thresholds. In the two-dimensional plot of FIG. 8C, the horizontal axis represents the different multipliers that may be applied to tighten the starting values for the given variable's upper and lower anomaly thresholds and the vertical axis represents the extent of univariate anomalies detected by the given variable's anomaly thresholds in terms of anomaly percentage.

Figure 8C:
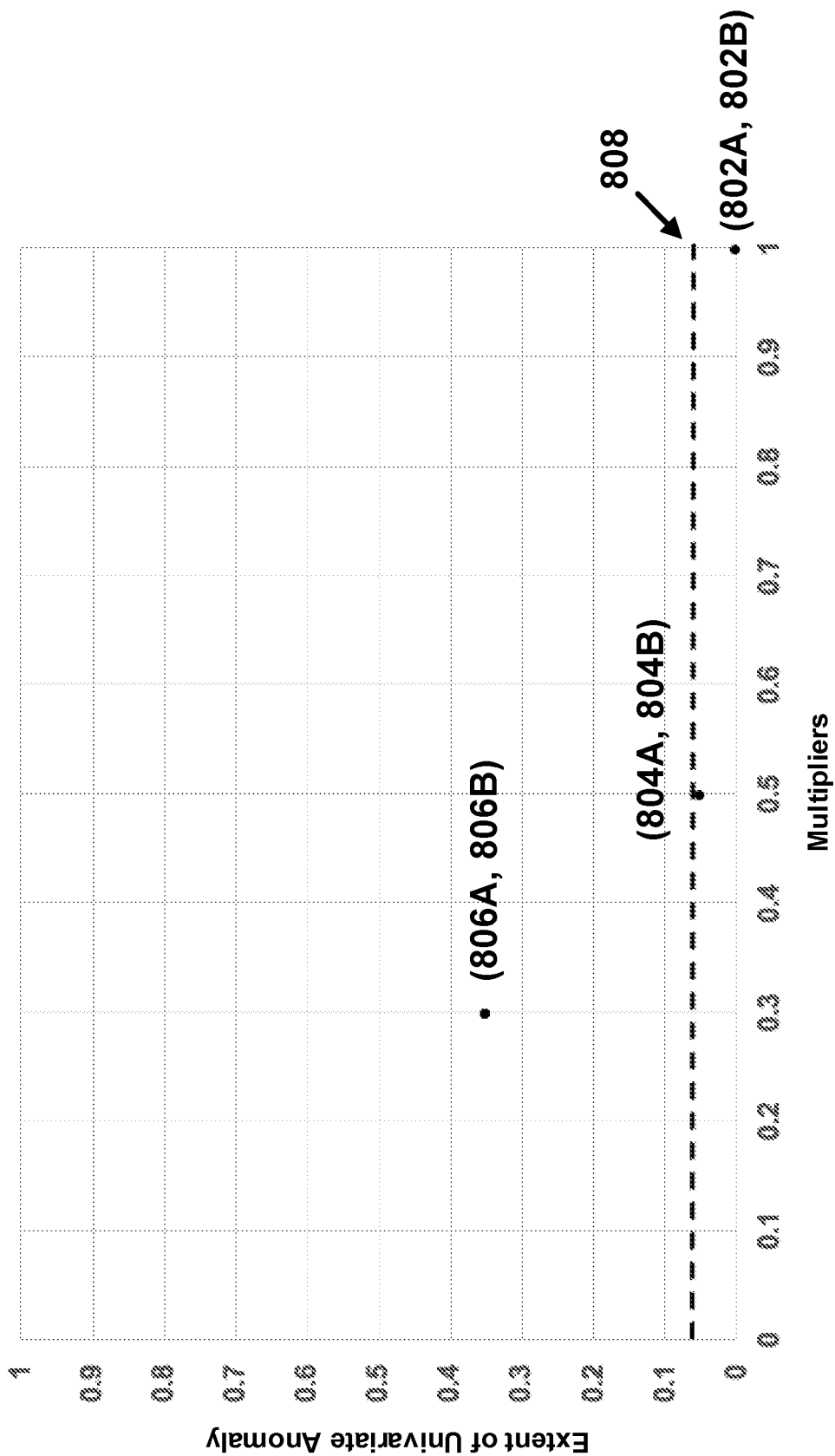
FIG. 8C depicts a two-dimensional plot of the extent of univariate anomalies detected in the set of test data for the given variable when using various different multiplier values.

As shown in FIG. 8C, there is (1) a first data point for the starting values 802A, 802B of the given variables upper and lower anomaly thresholds that corresponds to a multiplier value of 1 and shows an anomaly percentage of 0%, (2) a second data point for the tightened values 804A, 804B of the given variables upper and lower anomaly thresholds that corresponds to a multiplier value of 0.5 and shows an anomaly percentage of 5%, and (3) a third data point for the tightened values 806A, 806B that corresponds to a multiplier value of 0.3 and shows an anomaly percentage of 35%. Additionally, FIG. 8C also shows a line 808 that represents the dividing line between a de minimis extent of anomalies and a meaningful extent of anomalies, which has been set to an anomaly threshold of 6% in the illustrated example. Thus, FIG. 8C shows that if the multiplier value used by asset data platform 102 to tighten the starting values for the given variable's upper and lower anomaly thresholds was 0.5, then the extent of anomalies detected for the given variable would fall below line 808 and the given variable would be deemed non-anomalous. On the other hand, FIG. 8C shows that if the multiplier value used by asset data platform 102 to tighten the starting values for the given variable's upper and lower anomaly thresholds was 0.3, then the extent of anomalies detected for the given variable would fall above line 808 and the given variable would be deemed anomalous.

The process of using the starting values for the set of anomaly thresholds and the set of test data originating from the given data source to differentiate between non-anomalous and anomalous variables included within the given set of variables may take various other forms as well.

For any variable in the given set that is deemed to be non-anomalous, asset data platform 102 may then decide to use the starting value(s) for the variable's upper and/or lower anomaly thresholds (e.g., starting values 802A, 802B in FIG. 8A) as the final values for the variable's upper and/or lower anomaly thresholds. In turn, asset data platform 102 may optionally eliminate the non-anomalous variables from the given set of variables before performing the function of refining the starting values for the set of anomaly thresholds.

At block 608, asset data platform 102 may then use a set of test data to refine the starting values of the anomaly thresholds for at least the anomalous variables in the given set of variables. In this respect, the set of test data that is used to refine the starting values of the anomaly thresholds may be obtained in various manners, including but not limited to any of the manners described above with respect to set of test data used to differentiate between non-anomalous and anomalous variables. Further, in an embodiment where asset data platform 102 is configured to differentiate between non-anomalous and anomalous variables before refining the starting values of the anomaly thresholds, the set of test data used to refine the starting values of the anomaly thresholds may either be the same as or different than the set of test data used to differentiate between non-anomalous and anomalous variables.

Further, the function of using the set of test data to refine the starting values of the anomaly thresholds for at least the anomalous variables in the given set of variables may take various forms. As one possible implementation, this operation may involve adjusting the starting values for the anomalous variables' anomaly thresholds in an iterative, multivariate fashion, where each iteration involves multiplying the starting values for the anomalous variables' anomaly thresholds by a given one of a range of multiplier values. In this respect, the range of multiplier values may include values below one (which may tighten the starting values) as well as values above one (which may loosen the starting values). Further, the minimum multiplier value within the range, the maximum multiplier value within the range, and the increments between the multiplier values within the range may all take various forms.

During each respective iteration, asset data platform 102 may (1) multiply the starting values for the anomalous variables' anomaly thresholds by a respective multiplier value within the range, (2) apply the adjusted values for the anomalous variables' anomaly thresholds to the set of test data originating from the given data source, and then (3) determine an extent of multivariate anomalies detected in the set of test data when using these adjusted values resulting from multiplying the starting values by the respective multiplier value. In this respect, the criteria that defines whether a multivariate anomaly has occurred—as well as the related function of determining an extent of multivariate anomalies detected in the test data—may take various forms.

For instance, as one possibility, asset data platform 102 may determine that a multivariate anomaly has occurred when a threshold extent of multivariate exceedances (i.e., data points having a score value that violates an anomaly threshold for at least one variable) has occurred in any sequence of data points within a given window, which may be referred to as a "sliding window" approach. In this respect, the length of the window may be defined in terms of a particular number of data points (e.g., 50 data points) or a particular amount of time (e.g., an hour, a day, etc.), among other possibilities. As another possibility, asset data platform 102 may determine that a multivariate anomaly has occurred each time any individual multivariate exceedance is detected. The criteria used by asset data platform 102 to determine whether a multivariate anomaly has occurred may take other forms as well.

As a result of this iterative process described above, asset data platform 102 may generate a dataset that includes a respective extent of multivariate anomalies detected in the set of test data associated with each given multiplier value in the range of multiplier values. In this respect, it should be understood that the smaller multiplier values in the range generally result in a greater extent of anomalies being detected in the test data points and the larger multiplier values in the range generally result in a lesser extent of anomalies being detected in the test data points.

Further, in practice, there will generally be a transition point within the range of multiplier values that serves as a dividing line between (1) a first range of multiplier values below the transition point that, when applied to the starting values of the anomalous variables' anomaly thresholds, each cause an exponential increase in the extent of multivariate anomalies detected relative to the increase caused by next-highest multiplier value in the range (i.e., the next multiplier value to the right when plotted on an x-axis) and (2) a second range of multiplier values above the transition point that, when applied to the starting values of the anomalous variables' anomaly thresholds, each cause a non-exponential (e.g., linear) increase in the extent of multivariate anomalies detected relative to the increase caused by the next-highest multiplier value in the range (i.e., the next multiplier value to the right when plotted on an x-axis). In this respect, as the multiplier value decreases from the maximum multiplier value in the range to the minimum multiplier value in the range, the transition point may correspond to the multiplier value at which the extent of multivariate anomalies detected begins to increase exponentially (after having previously only experienced non-exponential changes). This transition point may be referred to as the "elbow" of the dataset.

Asset data platform 102 may then evaluate this dataset in order to select the multiplier value in the range of multiplier values that best "optimizes" the values of the anomalous variables' anomaly thresholds (e.g., in terms of the balance between over-detection and under-detection of anomalies), which will preferably be the multiplier value associated with the "elbow" of the dataset. Asset data platform 102 may carry out this operation in various manners.

In one possible implementation, asset data platform 102 may (1) represent the dataset as a two-dimensional plot where the multiplier value comprises one axis and the extent of multivariate anomalies detected comprises the other axis, (2) identify the data point that is the furthest away from a straight line drawn between the data point corresponding to the smallest multiplier value within the range and the data point corresponding to the largest multiplier value within the range, which is considered to be the "elbow" of the dataset, and (3) select the multiplier value associated with the identified data point. However, asset data platform 102 may select the multiplier value that best "optimizes" the values of the anomalous variables' anomaly thresholds in other manners as well.

These example functions will now be described in further detail with reference to FIG. 9, which is a two-dimensional plot that shows the extent of multivariate anomalies detected in an example set of test data when using various different multipliers to adjust the starting values of the anomalous variables' anomaly thresholds. In the two-dimensional plot of FIG. 9, the horizontal axis represents the different multipliers that may be applied to adjust the starting values of the anomaly thresholds for at least the anomalous variables and the vertical axis represents the extent of multivariate anomalies detected by the anomalous variables' anomaly thresholds in terms of anomaly percentage.

Figure 9:
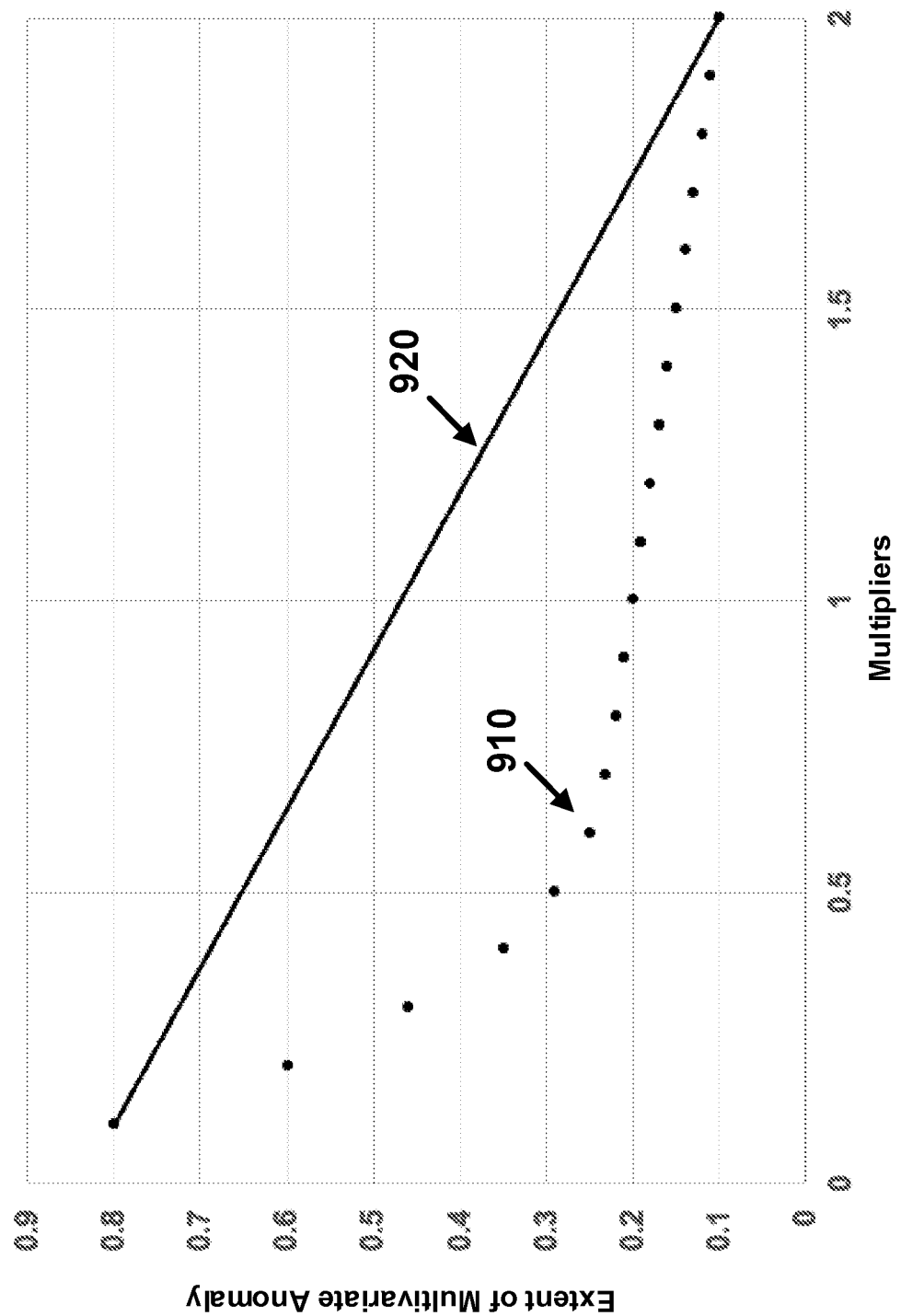
FIG. 9 depicts a two-dimensional plot of the extent of multivariate anomalies detected for a range of multiplier values.

FIG. 9 illustrates an example where asset data platform 102 iteratively adjusts the starting values of all anomalous variables' anomaly thresholds by multiplier values that range from 0.1 to 2.0 in increments of 0.1 and determines an extent of multivariate anomalies detected in the example set of test data when applying each such multiplier value, which results in a dataset that includes a respective extent of multivariate anomalies detected in the example set of test data associated with each given multiplier value in the range of multiplier values. For example, in the example of FIG. 9, applying a multiplier of 0.1 to the starting values of the anomalous variables' anomaly thresholds yields a multivariate anomaly percentage of 80%, applying a multiplier of 0.2 to the starting values of the anomalous variables' anomaly thresholds yields a multivariate anomaly percentage of 60%, and so on. This dataset is represented in the two-dimensional plot illustrated in FIG. 9.

In turn, asset data platform 102 may evaluate this dataset in order to select the multiplier value in the range of multiplier values that best "optimizes" the values of the anomalous variables' anomaly thresholds. To do so, asset data platform 102 may identify the "elbow" of the dataset by (1) drawing a straight line between the point in the dataset corresponding to the smallest multiplier value within the range and the point in the dataset corresponding to the largest multiplier value within the range, which in the example of FIG. 9 is represented as a line 920 between the data point corresponding to a multiplier of 0.1 and the data point corresponding to the multiplier of 2.0, and (2) identifying the point in the dataset that is the furthest away from line 920, which in the example of FIG. 9 is data point 910. Asset data platform 102 may then select the multiplier value corresponding to data point 910—which is 0.6—as the multiplier value that best optimizes the values of the anomalous variables' anomaly thresholds.

Asset data platform 102 may select the multiplier value that best optimizes the values of the anomalous variables' anomaly thresholds in other manners as well.

After selecting the multiplier value that best optimizes the values of the anomalous variables' anomaly thresholds (e.g., the multiplier value corresponding to the elbow of the dataset that includes a respective extent of multivariate anomalies detected in the set of test data associated with each given multiplier value in the range of multiplier values), asset data platform 102 may use the selected multiplier value to finalize the values for the anomalous variables' anomaly thresholds. For instance, in one implementation, asset data platform 102 may use the adjusted values for the anomalous variables' anomaly thresholds that result from multiplying the starting values by the selected multiplier value as the final values for the variables' anomaly thresholds. In another implementation, asset data platform 102 may be configured to compare the selected multiplier value to a minimum acceptable multiplier value and then either (1) use the adjusted values for the anomalous variables' anomaly thresholds that result from multiplying the starting values by the selected multiplier value as the final values for the variables' anomaly thresholds if the selected multiplier value is at or above the minimum acceptable multiplier value or (2) use the starting values for the variables' anomaly thresholds if the selected multiplier value is below the minimum acceptable multiplier value. Other implementations are possible as well.

In sum, asset data platform 102 may perform the disclosed process of FIG. 6 to (1) extract a model object (e.g., projection matrix) that is used to score multivariate observation data originating from a given data source, and (2) determine the final values for a set of anomaly thresholds that are used to evaluate the scored observation data for purposes of determining whether anomalies exist in the multivariate observation data, where at least some of the final values for the set of anomaly thresholds (e.g., the values for the anomalous variables' anomaly thresholds) have been refined using multivariate test data originating from the given data source.

Once asset data platform 102 has determined the final values for all anomaly thresholds in the set of anomaly thresholds for the anomaly detection model using the foregoing process, asset data platform 102 may then begin using the anomaly detection model to monitor for anomalies in observation data originating from the given data source. In this respect, asset data platform 102 may score observation data originating from the given data source and identify instances where the scored values fall outside the final values of any of the anomaly thresholds in the set of anomaly thresholds for the anomaly detection model (which may be considered an exceedance). Asset data platform 102 may then evaluate whether the number of exceedances lead to a determination that an anomaly has occurred, which as described above, may depend on whether a threshold number of exceedances have been detected over a given number of data points or over a given period of time, for example.

For instance, in an example involving a PCA-based anomaly detection model, asset data platform 102 may score observation data originating from the given data source by first inputting an observation data point into a projection matrix and thereby transforming the data point from its original coordinate space to the PCA coordinate space defined by the projection matrix. As part of this transformation, the data analytics platform may also standardize and/or modify the value of the data point in one or more dimensions of the PCA coordinate space in various manners, some examples of which are disclosed in U.S. application Ser. Nos. 15/367,012 and 15/788,622 that are incorporated herein by reference in their entirety. Asset data platform 102 may then complete the scoring operation for the data point by inversely transforming the data point from the PCA coordinate space back to the original coordinate space—which produces a predicted version of the data point—and then determining a difference value between original and predicted versions of the data point for each variable included in the original coordinate space of the multivariate data, which may be considered the multivariate score value for the data point.

Asset data platform 102 may perform a similar scoring operation for each remaining observation data point, which may result in a respective multivariate score value being determined for each observation data point. In turn, asset data platform 102 may then evaluate the multivariate score values using the final values of the set of anomaly thresholds, in order to determine whether any anomalies exist in the multivariate observation data points.

For instance, in one implementation, asset data platform 102 may begin by evaluating each data point's multivariate score value to determine whether that multivariate score value violates any anomaly threshold in the set of anomaly thresholds (e.g., by having a difference value for at least one variable that exceeds an upper and/or lower anomaly threshold for that variable) such that it is deemed to be an exceedance. In turn, asset data platform 102 may determine whether the exceedances detected in the observation data amount to any anomaly occurrence(s), such as by determining whether a threshold extent of exceedances has occurred in any sequence of data points within a given window.

Depending on the type of model that has been created and deployed, asset data platform 102 may monitor for anomalies in observation data originating from the given data source in various other manners as well.

Further, in accordance with the present disclosure, several variations of the disclosed process illustrated in FIG. 6 are also possible. As one possibility, the operation of refining the starting values of the anomaly thresholds (i.e., block 608 of FIG. 6) could be applied to anomalous variables only, both anomalous and non-anomalous variables, or some other subset of variables included in the multivariate data originating from the given data source. As another possibility, the set of training data and the set of test data may be obtained from the same data source, different data sources, or some combination of data sources described above. As yet another possibility, a given variable may have an upper anomaly threshold, a lower anomaly threshold, or a pair of upper and lower anomaly thresholds, and asset data platform 102 may perform the disclosed process with either or both types of anomaly thresholds. Other variations of the disclosed process are possible as well.

VI. Conclusion

Example embodiments of the disclosed innovations have been described above. Those skilled in the art will understand, however, that changes and modifications may be made to the embodiments described without departing from the true scope and sprit of the present invention, which will be defined by the claims.

Further, to the extent that examples described herein involve operations performed or initiated by actors, such as "humans", "operators", "users" or other entities, this is for purposes of example and explanation only. The claims should not be construed as requiring action by such actors unless explicitly recited in the claim language.

What is claimed is:

1. A computing system comprising:
   a communication interface;
   at least one processor;
   a non-transitory computer-readable medium; and
   program instructions stored on the non-transitory computer-readable medium that are executable by the at least one processor to cause the computing system to perform functions including:
      creating an anomaly detection model that is configured to detect anomalies in multivariate data originating from a given data source by:
         extracting a model object for the anomaly detection model using a first set of training data originating from the given data source;
         establishing starting values of a set of anomaly thresholds for the anomaly detection model using the extracted model object and a second set of training data originating from the given data source, wherein the set of anomaly thresholds includes at least one respective anomaly threshold for each of a given set of variables included in the multivariate data originating from the given data source;

refining the starting values of at least a subset of anomaly thresholds from the set of anomaly thresholds using the extracted model object and a set of test data originating from the given data source by:
for each respective multiplier value in a set of multiplier values, (a) adjusting the starting values of the subset of anomaly thresholds using the respective multiplier value and thereby producing adjusted values of the subset of anomaly thresholds that correspond to the respective multiplier value, and (b) determining a respective extent of multivariate anomalies detected in the set of test data when evaluated using the extracted model object and the adjusted values of the subset of anomaly thresholds that correspond to the respective multiplier value, thereby producing a dataset that comprises the respective extent of multivariate anomalies determined for each respective multiplier value in the set of multiplier values;
based on an evaluation of the dataset, selecting a given multiplier value from the set of multiplier values; and
using the adjusted values of the subset of anomaly thresholds that correspond to the given multiplier value as a basis for updating the starting values of the subset of anomaly thresholds; and
using the anomaly detection model to monitor for anomalies in observation data originating from the given data source.

2. The computing system of claim 1, wherein selecting the given multiplier value from the set of multiplier values based on the evaluation of the dataset comprises selecting whichever multiplier value in the set of multiplier values is associated with an elbow of the dataset.

3. The computing system of claim 1, wherein determining the respective extent of multivariate anomalies detected in the set of test data when evaluated using the extracted model object and the adjusted values of the subset of anomaly thresholds that correspond to the respective multiplier value comprises determining that a threshold extent of multivariate exceedances has occurred within a given window.

4. The computing system of claim 2, wherein selecting the given multiplier value from the set of multiplier values to be whichever multiplier value is associated with the elbow of the dataset comprises:
identifying a data point within the dataset that is furthest away from a straight line drawn between a data point corresponding to a smallest multiplier value within the set of multiplier values and a data point corresponding to a largest multiplier value within the set of multiplier values; and
identifying the multiplier value corresponding to the identified data point.

5. The computing system of claim 1, wherein the subset of anomaly thresholds includes any anomaly thresholds in the set of anomaly thresholds that are for anomalous variables in the given set of variables and excludes any anomaly thresholds in the set of anomaly thresholds that are for non-anomalous variables in the given set of variables, and wherein the computing system further comprises program instructions stored on the non-transitory computer-readable medium that are executable by the at least one processor to cause the computing system to perform functions including:
before refining the starting values of the subset of anomaly thresholds, differentiating between the non-anomalous variables and the anomalous variables in the given set of variables using the extracted model object, the starting values for the set of anomaly thresholds, and the set of test data; and
deciding to use the starting values of the set of anomaly thresholds for the non-anomalous variables without further refinement.

6. The computing system of claim 5, wherein differentiating between the non-anomalous variables and the anomalous variables in the given set of variables using the extracted model object, the starting values for the set of anomaly thresholds, and the set of test data comprises, for each variable in the given set of variables:
tightening the starting value of each of the at least one respective anomaly threshold for the variable by a given amount;
determining an extent of univariate anomalies detected in the set of test data for the variable when evaluated using the extracted model object and the tightened value of each of the at least one respective anomaly threshold for the variable;
comparing the determined extent of univariate anomalies to a threshold value that serves as a dividing line between a de minimis extent of anomalies and a meaningful extent of anomalies; and
identifying the variable as either:
(i) non-anomalous if the extent of univariate anomalies detected in the set of test data for the variable is below the threshold or
(ii) anomalous if the extent of univariate anomalies detected in the set of test data for the variable is not below the threshold.

7. The computing system of claim 1, wherein extracting the model object for the anomaly detection model using the first set of training data originating from the given data source comprises:
deriving a set of training metrics from the first set of training data; and
using the derived set of training metrics to extract the model object for the anomaly detection model.

8. The computing system of claim 1, wherein establishing starting values of the set of anomaly thresholds for the anomaly detection model using the extracted model object and the second set of training data comprises:
scoring the second set of training data using the extracted model object for the anomaly detection model; and
using a distribution of score values for each of the given set of variables included in the multivariate data originating from the given data source to determine at least one respective anomaly threshold for each of the given set of variables.

9. The computing system of claim 1, wherein the given data source comprises an asset, and wherein the multivariate data originating from the given data source comprises multivariate sensor data.

10. The computing system of claim 1, wherein the anomaly detection model comprises a regression model based on principal component analysis (PCA), and wherein the model object comprises a projection matrix.

11. The computing system of claim 1, wherein using the anomaly detection model to monitor for anomalies in observation data originating from the given data source comprises:

using the extracted model object for the anomaly detection model to score each of plurality of multivariate data points originating from the given data source;
evaluating whether a threshold extent of multivariate data points within a given window of time violate the set of anomaly thresholds for the anomaly detection model; and
determine that an anomaly has occurred if it is determined that the threshold extent of multivariate data points within the given window of time violate the set of anomaly thresholds for the anomaly detection model.

12. A method performed by a computing system, the method comprising:
creating an anomaly detection model that is configured to detect anomalies in multivariate data originating from a given data source by:
extracting a model object for the anomaly detection model using a first set of training data originating from the given data source;
establishing starting values of a set of anomaly thresholds for the anomaly detection model using the extracted model object and a second set of training data originating from the given data source, wherein the set of anomaly thresholds includes at least one respective anomaly threshold for each of a given set of variables included in the multivariate data originating from the given data source;
refining the starting values of at least a subset of anomaly thresholds from the set of anomaly thresholds using the extracted model object and a set of test data originating from the given data source by:
for each respective multiplier value in a set of multiplier values, (a) adjusting the starting values of the subset of anomaly thresholds using the respective multiplier value and thereby producing adjusted values of the subset of anomaly thresholds that correspond to the respective multiplier value, and (b) determining a respective extent of multivariate anomalies detected in the set of test data when evaluated using the extracted model object and the adjusted values of the subset of anomaly thresholds that correspond to the respective multiplier value, thereby producing a dataset that comprises the respective extent of multivariate anomalies determined for each respective multiplier value in the set of multiplier values;
based on an evaluation of the dataset, selecting a given multiplier value from the set of multiplier values; and
using the adjusted values of the subset of anomaly thresholds that correspond to the given multiplier value as a basis for updating the starting values of the subset of anomaly thresholds; and
using the anomaly detection model to monitor for anomalies in observation data originating from the given data source.

13. The method of claim 12, wherein
selecting the given multiplier value from the set of multiplier values based on the evaluation of the dataset comprises selecting whichever multiplier value in the set of multiplier values is associated with an elbow of the dataset.

14. The method of claim 13, wherein selecting the given multiplier value from the set of multiplier values to be whichever multiplier value is associated with the elbow of the dataset comprises:

identifying a data point within the dataset that is furthest away from a straight line drawn between a data point corresponding to a smallest multiplier value within the set of multiplier values and a data point corresponding to a largest multiplier value within the set of multiplier values; and
identifying the multiplier value corresponding to the identified data point.

15. The method of claim 13, wherein the subset of anomaly thresholds includes any anomaly thresholds in the set of anomaly thresholds that are for anomalous variables in the given set of variables and excludes any anomaly thresholds in the set of anomaly thresholds that are for non-anomalous variables in the given set of variables, the method further comprising:
before refining the starting values of the subset of anomaly thresholds, differentiating between the non-anomalous variables and the anomalous variables in the given set of variables using the extracted model object, the starting values for the set of anomaly thresholds, and the set of test data; and
deciding to use the starting values of the set of anomaly thresholds for the non-anomalous variables without further refinement.

16. The method of claim 15, wherein differentiating between the non-anomalous variables and the anomalous variables in the given set of variables using the extracted model object, the starting values for the set of anomaly thresholds, and the set of test data comprises, for each variable in the given set of variables:
tightening the starting value of each of the at least one respective anomaly threshold for the variable by a given amount;
determining an extent of univariate anomalies detected in the set of test data for the variable when evaluated using the extracted model object and the tightened value of each of the at least one respective anomaly threshold for the variable;
comparing the determined extent of univariate anomalies to a threshold value that serves as a dividing line between a de minimis extent of anomalies and a meaningful extent of anomalies; and
identifying the variable as either:
(i) non-anomalous if the extent of univariate anomalies detected in the set of test data for the variable is below the threshold or
(ii) identifying the variable as anomalous if the extent of univariate anomalies detected in the set of test data for the variable is not below the threshold.

17. A non-transitory computer-readable storage medium having program instructions stored thereon that are executable to cause a computing system to:
create an anomaly detection model that is configured to detect anomalies in multivariate data originating from a given data source by:
extracting a model object for the anomaly detection model using a first set of training data originating from the given data source;
establishing starting values of a set of anomaly thresholds for the anomaly detection model using the extracted model object and a second set of training data originating from the given data source, wherein the set of anomaly thresholds includes at least one respective anomaly threshold for each of a given set of variables included in the multivariate data originating from the given data source;

refining the starting values of at least a subset of anomaly thresholds from the set of anomaly thresholds using the extracted model object and a set of test data originating from the given data source by:
  for each respective multiplier value in a set of multiplier values, (a) adjusting the starting values of the subset of anomaly thresholds using the respective multiplier value and thereby producing adjusted values of the subset of anomaly thresholds that correspond to the respective multiplier value, and (b) determining a respective extent of multivariate anomalies detected in the set of test data when evaluated using the extracted model object and the adjusted values of the subset of anomaly thresholds that correspond to the respective multiplier value, thereby producing a dataset that comprises the respective extent of multivariate anomalies determined for each respective multiplier value in the set of multiplier values;
  based on an evaluation of the dataset, selecting a given multiplier value from the set of multiplier values; and
  using the adjusted values of the subset of anomaly thresholds that correspond to the given multiplier value as a basis for updating the starting values of the subset of anomaly thresholds; and
use the anomaly detection model to monitor for anomalies in observation data originating from the given data source.

18. The non-transitory computer-readable storage medium of claim 17, wherein
  selecting the given multiplier value from the set of multiplier values based on the evaluation of the dataset comprises selecting whichever multiplier value in the set of multiplier values is associated with an elbow of the dataset.

19. The non-transitory computer-readable storage medium of claim 18, wherein selecting the given multiplier value from the set of multiplier values to be whichever multiplier value is associated with the elbow of the dataset comprises:
  identifying a data point within the dataset that is furthest away from a straight line drawn between a data point corresponding to a smallest multiplier value within the set of multiplier values and a data point corresponding to a largest multiplier value within the set of multiplier values; and
  identifying the multiplier value corresponding to the identified data point.

20. The non-transitory computer-readable storage medium of claim 17, wherein the subset of anomaly thresholds includes any anomaly thresholds in the set of anomaly thresholds that are for anomalous variables in the given set of variables and excludes any anomaly thresholds in the set of anomaly thresholds that are for non-anomalous variables in the given set of variables, and wherein non-transitory computer-readable storage medium further comprises program instructions stored thereon that are executable to cause the computing system to:
  before refining the starting values of the subset of anomaly thresholds, differentiate between the non-anomalous variables and the anomalous variables in the given set of variables using the extracted model object, the starting values for the set of anomaly thresholds, and the set of test data; and
  decide to use the starting values of the set of anomaly thresholds for the non-anomalous variables as the final values of the set of anomaly thresholds for the non-anomalous variables;
  wherein differentiating between the non-anomalous variables and the anomalous variables in the given set of variables using the extracted model object, the starting values for the set of anomaly thresholds, and the set of test data comprises, for each variable in the given set of variables:
    tightening the starting value of each of the at least one respective anomaly threshold for the variable by a given amount;
    determining an extent of univariate anomalies detected in the set of test data for the variable when evaluated using the extracted model object and the tightened value of each of the at least one respective anomaly threshold for the variable;
    comparing the determined extent of univariate anomalies to a threshold value that serves as a dividing line between a de minimis extent of anomalies and a meaningful extent of anomalies; and
    identifying the variable as either:
      (i) non-anomalous if the extent of univariate anomalies detected in the set of test data for the variable is below the threshold or
      (ii) identifying the variable as anomalous if the extent of univariate anomalies detected in the set of test data for the variable is not below the threshold.

* * * * *